United States Patent
Dailey et al.

(10) Patent No.: US 12,085,149 B2
(45) Date of Patent: Sep. 10, 2024

(54) FASTENER FOR CABLE CONVEYOR BELT

(71) Applicant: Flexible Steel Lacing Company, Downers Grove, IL (US)

(72) Inventors: Daniel W. Dailey, Dyer, IN (US); Brett E. DeVries, Comstock Park, MI (US); John Dale Culbertson, Rossville, GA (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 18/227,804

(22) Filed: Jul. 28, 2023

(65) Prior Publication Data

US 2024/0035545 A1    Feb. 1, 2024

Related U.S. Application Data

(63) Continuation of application No. 17/331,326, filed on May 26, 2021, now Pat. No. 11,713,796, which is a (Continued)

(51) Int. Cl.
   *F16G 3/04* (2006.01)
   *B65G 15/50* (2006.01)
   *B65G 15/32* (2006.01)

(52) U.S. Cl.
   CPC ............... *F16G 3/04* (2013.01); *B65G 15/50* (2013.01); *B65G 15/32* (2013.01)

(58) Field of Classification Search
   CPC ............ F16G 3/04; B65G 15/50; B65G 15/32
   (Continued)

(56) References Cited

U.S. PATENT DOCUMENTS

| 1,420,962 A | 6/1922 | Breuer |
| 1,442,922 A | 1/1923 | Bradshaw |

(Continued)

FOREIGN PATENT DOCUMENTS

| CN | 201258946 Y | 6/2009 |
| CN | 102575747 A | 7/2012 |

(Continued)

OTHER PUBLICATIONS

International Search Report and Written Opinion issued in International Application No. PCT/US19/55974, mailed Dec. 19, 2019, 10 pages.

(Continued)

*Primary Examiner* — Gene O Crawford
*Assistant Examiner* — Lester Rushin, III
(74) *Attorney, Agent, or Firm* — Fitch, Even, Tabin & Flannery LLP

(57) ABSTRACT

In accordance with one aspect of the present disclosure, a fastener is provided for securing to an end of a conveyor belt having cables. The fastener comprises a crimp configured to be fixed to a conveyor belt cable and a connector. The connector has a unitary, one-piece fastener body with an upper portion for being disposed adjacent an upper surface of the conveyor belt end and a lower portion for being disposed adjacent a lower surface of the conveyor belt end. The upper and lower portions are spaced apart to receive the crimp therebetween and permit the conveyor belt cable to extend in an outboard direction between the upper and lower portions. The connector includes a stop arranged to block inboard movement of the crimp and the conveyor belt cable fixed thereto.

24 Claims, 32 Drawing Sheets

Related U.S. Application Data continuation of application No. 16/600,293, filed on Oct. 11, 2019, now Pat. No. 11,022,197.

(60) Provisional application No. 62/744,458, filed on Oct. 11, 2018.

(58) Field of Classification Search
USPC .................................................... 198/844.2
See application file for complete search history.

(56) References Cited

U.S. PATENT DOCUMENTS

| | | |
|---|---|---|
| 1,612,024 A | 12/1926 | Jacobs |
| 1,735,686 A | 11/1929 | Kimmich |
| 1,895,345 A | 1/1933 | Pink |
| 2,265,604 A | 12/1941 | Knoedler |
| 2,358,534 A | 9/1944 | Perry |
| 2,441,460 A | 5/1948 | Walters |
| 2,449,950 A | 9/1948 | Nassimbene |
| 2,566,262 A | 8/1951 | Traxler |
| 2,935,774 A | 5/1960 | Schick |
| 2,955,065 A | 10/1960 | Victor |
| 3,105,390 A | 10/1963 | Funke |
| 3,212,147 A | 10/1965 | Lambert |
| 3,234,611 A | 2/1966 | Paasche |
| 3,245,276 A | 4/1966 | Abner |
| 3,327,359 A | 6/1967 | Wiese |
| 3,481,807 A | 12/1969 | Hisao |
| 3,487,871 A | 1/1970 | Kanamori |
| 3,546,054 A | 12/1970 | Ross |
| 3,562,892 A | 2/1971 | Laneri |
| 3,693,218 A | 9/1972 | Jaubert |
| 3,719,969 A | 3/1973 | Mc Ginnis |
| 3,724,645 A | 4/1973 | Spaar |
| 3,748,698 A | 7/1973 | Lachmann |
| 3,839,766 A * | 10/1974 | Kenney ............. F16G 3/08 24/31 W |
| 3,853,526 A | 12/1974 | Hochart |
| 3,936,338 A | 2/1976 | Gibson |
| 3,945,263 A | 3/1976 | Simonsen |
| 4,030,595 A | 6/1977 | McCombie |
| 4,031,767 A | 6/1977 | Guyer |
| 4,032,384 A | 6/1977 | Rauscher |
| 4,034,617 A | 7/1977 | Guyer |
| 4,099,608 A | 7/1978 | McCombie |
| 4,235,120 A | 11/1980 | Candle |
| 4,411,724 A | 10/1983 | Ito |
| 4,489,828 A | 12/1984 | Stipdonk |
| 4,548,663 A | 10/1985 | Worcester |
| 4,564,542 A | 1/1986 | Worcester |
| 4,618,387 A | 10/1986 | Fisher |
| 4,648,856 A | 3/1987 | Matsunaga |
| 4,671,834 A | 6/1987 | Price |
| 4,681,646 A | 7/1987 | Pinto |
| 4,703,845 A | 11/1987 | Veenhof |
| 4,715,106 A | 12/1987 | Peterson |
| 4,734,959 A | 4/1988 | Jaubert |
| 4,741,235 A | 5/1988 | Price |
| 4,752,989 A | 6/1988 | Jaubert |
| 4,757,576 A | 7/1988 | Jaubert |
| 4,767,244 A | 8/1988 | Peterson |
| 4,911,683 A | 3/1990 | Legge |
| 5,083,985 A | 1/1992 | Alles |
| 5,186,312 A | 2/1993 | Ambs |
| 5,341,545 A * | 8/1994 | Herold ............. F16G 3/08 24/31 W |
| 5,346,439 A | 9/1994 | Lynch |
| 5,348,143 A | 9/1994 | Musil |
| 5,377,818 A | 1/1995 | White |
| 5,415,913 A | 5/1995 | Clevenger, Jr. |
| 5,542,527 A | 8/1996 | Jakob |
| 5,573,470 A | 11/1996 | Jakob |
| 5,632,701 A | 5/1997 | Neel |
| 5,724,706 A | 3/1998 | Jakob |
| 5,839,571 A | 11/1998 | Jakob |
| 5,881,863 A | 3/1999 | Borner |
| 5,890,266 A * | 4/1999 | Herold ............. F16G 3/02 198/844.2 |
| 6,102,196 A | 8/2000 | Domit, Jr. |
| 6,353,976 B1 | 3/2002 | Sutherland |
| 6,516,943 B2 | 2/2003 | Engle |
| 6,554,934 B1 | 4/2003 | Steven |
| 6,601,698 B2 | 8/2003 | Jakob |
| 6,689,247 B1 | 2/2004 | Steven |
| 6,695,133 B2 | 2/2004 | Bovaird |
| 6,749,708 B2 | 6/2004 | Allen |
| 6,808,580 B2 | 10/2004 | Allen |
| 6,848,571 B2 | 2/2005 | Allen |
| 7,261,929 B2 | 8/2007 | Allen |
| 7,703,600 B1 | 4/2010 | Price |
| 7,721,877 B2 | 5/2010 | Maine, Jr. |
| 8,066,116 B2 | 11/2011 | Herold |
| 8,151,432 B2 | 4/2012 | Daniels |
| 8,365,906 B2 | 2/2013 | Moeschen-Siekmann |
| 8,453,320 B2 | 6/2013 | Van Swearingen |
| 8,770,394 B2 | 7/2014 | Huels |
| 8,910,462 B2 | 12/2014 | De Smet |
| 9,033,137 B2 | 5/2015 | Koppes |
| 9,428,340 B2 | 8/2016 | Gilg |
| 9,466,896 B2 | 10/2016 | Harmason |
| 9,506,526 B2 | 11/2016 | Moeschen-Siekmann |
| 11,022,197 B2 | 6/2021 | Dailey |
| 11,713,796 B2 | 8/2023 | Dailey |
| 2018/0128348 A1 | 5/2018 | Huels |
| 2018/0298985 A1 | 10/2018 | Huels |
| 2023/0243401 A1* | 8/2023 | Kuiper ............. F16G 3/04 198/844.2 |

FOREIGN PATENT DOCUMENTS

| | | |
|---|---|---|
| CN | 205118121 U | 3/2016 |
| DE | 1101062 B | 3/1961 |
| DE | 2155747 | 5/1973 |
| DE | 2234916 | 1/1974 |
| DE | 2357994 | 6/1974 |
| DE | 2320410 | 10/1974 |
| DE | 3310224 | 10/1983 |
| DE | 3227729 | 1/1984 |
| DE | 3941675 | 6/1991 |
| DE | 19856271 | 6/2000 |
| DE | 102014224526 | 6/2016 |
| EP | 0073933 | 3/1983 |
| EP | 3115642 A1 | 1/2017 |
| FR | 2294954 | 7/1976 |
| JP | 4346119 | 5/1999 |
| JP | H11130220 | 5/1999 |
| JP | 11173384 | 6/1999 |
| JP | 2000018335 | 1/2000 |
| JP | 2000119930 | 4/2000 |
| JP | 3428498 | 12/2000 |
| JP | 2000344319 | 12/2000 |
| JP | 2001021006 | 1/2001 |
| JP | 2001355681 | 12/2001 |
| JP | 2005343685 | 12/2005 |
| RO | 115612 | 4/2000 |
| RO | 115613 | 4/2000 |
| SU | 499186 | 1/1976 |
| SU | 652393 | 3/1979 |
| SU | 655608 | 4/1979 |
| SU | 783035 | 11/1980 |
| SU | 783521 | 11/1980 |
| SU | 1551881 | 3/1990 |
| SU | 1694442 | 11/1991 |
| WO | 2012038155 | 3/2012 |
| WO | 2016096433 A1 | 6/2016 |
| WO | 2017005384 A1 | 1/2017 |
| ZA | 200002997 | 3/2001 |

OTHER PUBLICATIONS

YouTube Video entitled "How to make your own replacement gym Cables—DIY Gym Cables" https://www.youtube.com/watch?v=

(56) References Cited

OTHER PUBLICATIONS nn289DvKjP8; published Mar. 30, 2017 Disclosing Screen Captures and Audio Transcription.
Extended European Search Report issued in related European Application No. 19871179.8, on Jun. 14, 2022, 11 pages.
Search Report and Written Opinion with machine English translation issued in related Chilean Application No. 202100876 on May 19, 2022, 48 pages.
First Office Action with machine English translation issued in related Chinese Application No. 201980082306.7 on Jul. 3, 2022, 17 pages.
USPTO; U.S. Appl. No. 17/331,326; Non-Final Rejection mailed Sep. 27, 2022; (pp. 1-7).
Examination Report with English translation issued in related Indian Application No. 202117020575 on Nov. 28, 2022; 5 pages.
Resolution of Acceptance with English translation issued in related Chilean Application No. 202100876 on Nov. 21, 2022; 2 pages.
Moeschen, Steel Cable Conveyor Belt Having a Connection Hinge for Coupling Two Belt Ends, Mar. 29, 2012, WIPO (Year: 2012).
USPTO; U.S. Appl. No. 17/331,326; Notice of Allowance and Fees Due (PTOL-85) mailed Mar. 8, 2023; (pp. 1-10).
Office Action with machine English translation issued in related Brazilian Application No. 112021006840-6 on Mar. 8, 2023; 8 pages.
USPTO; U.S. Appl. No. 16/600,293; Office Action mailed Sep. 2, 2020, (pp. 1-19).
USPTO; U.S. Appl. No. 16/600,293; Notice of Allowance mailed Feb. 3, 2021; (pp. 1-9).
Examination Report in related Canadian Application No. 3115809; dated Apr. 4, 2024; 3 pages.

\* cited by examiner

FASTENER FOR CABLE CONVEYOR BELT

CROSS REFERENCE TO RELATED APPLICATION

This application is a continuation of U.S. patent application Ser. No. 17/331,326, filed May 26, 2021, which is a continuation of U.S. patent application Ser. No. 16/600,293, filed Oct. 11, 2019, which issued as U.S. Pat. No. 11,022,197 on Jun. 1, 2021, which claims the benefit of U.S. Provisional Patent Application No. 62/744,458, filed Oct. 11, 2018, all of which are hereby incorporated by reference in their entireties.

FIELD

This disclosure relates to fasteners for conveyor belts and, more specifically, to fasteners for conveyor belts containing cables.

BACKGROUND

Steel cable conveyor belts contain rubber and cables embedded in the rubber that extend the length of the conveyor belt. The steel cables often have a diameter in the range of 3 mm to 13 mm. The cables provide tensile strength to the conveyor belt as the conveyor belt is loaded with conveyed material and goes over and around pulleys along the path of the conveyor belt. The tension in each cable is shared with nearby cables by rubber that extends between the cables and which is placed in shear as the cables are placed in tension.

Steel cable conveyor belts are typically used in heavy duty applications that involve material conveyed on the conveyor belt being measured in tons, the conveyor belt can extend a half mile or more, and the conveyor belt being four feet wide or more. Steel cable conveyor belts must have high strength to withstand these applications and have working load ratings that range from 800 pounds per inch width (PIW) to 8,500 PIW. Given the size and construction of steel cable conveyor belts, it is often difficult to repair a steel cable belt when the belt is damaged. Steel cable conveyor belts may be damaged by, for example, a very heavy object falling onto the conveyor belt or an object tearing the belt.

Connecting the ends of a new steel cable conveyor belt, or repairing a severely damaged steel cable conveyor belt is a complicated process that requires a high degree of skill, specialized tools, and a large amount of time. Conventional installation and repair protocols involve a facility shutting down the conveyor and requesting a specialized team visit the facility to install or repair the conveyor belt. Facilities utilizing steel cable conveyor belts are often in remote areas such that it may be several days before a team can reach the facility.

For a repair, when the repair team arrives at the facility, a temporary shelter is erected to protect the damaged section of the conveyor belt from the environment. The damaged section of belting is identified and the entire damaged section is typically removed by cutting the section out completely. This leaves the ends of the conveyor belt to either be joined together with a single splice or joined together with a new length of belt (sometimes referred to as a "saddle"). When a saddle is used to join the ends, the repair operation involves creating two splices, i.e., one splice between one belt end and the saddle and another belt splice between the other belt end and the saddle.

To prepare the conveyor belt for splicing, the team first pulls off a top cover of the belt at one of the freshly cut ends of the remaining undamaged conveyor belt, separates the cables from the rubber of a lower cover of the conveyor belt at the one end, and pulls off the lower cover at the one end. Any rubber remaining on the cables is trimmed off by hand. The cables are then cut to have lengths according to splice instructions from the steel cable belt manufacturer. The preparation process is repeated at the other end of the conveyor belt.

The team positions a lower platen of a vulcanizing press below the conveyor belt ends. Vulcanizing presses for steel cable conveyor belts are often very large and require a crane to lift the vulcanizing press into position. The cables of the conveyor belt ends are cleaned and specialized cement is applied to the cables to prepare the cables to bond with the rubber of the splice. Next, a lower cover of the splice is positioned below the cables and the cables are arranged in a pattern according to the splice instructions from the conveyor belt manufacturer. Uncured rubber noodles and gap filler are used to fill the areas between the cables. An upper cover of the splice is then positioned on the cables.

Using a crane, the upper platen of the vulcanizing press is positioned on the upper cover to sandwich the upper cover, steel cables, and lower cover between the upper and lower platens of the press. The vulcanizing press is operated to raise the temperature of the splice to a predetermined temperature and compress the splice with a predetermined pressure. After the vulcanization process is complete, the team uses the crane to remove the upper platen. The splice is lifted off of the lower platen so that the splice may cool. The lower platen is subsequently removed from the conveyor belt and the conveyor belt is ready for use. For higher tensions, splice length can be upwards of 15 feet or more and require multiple vulcanizing cycles as the presses are not long enough to cook the entire splice length and must be moved longitudinally along the splice length.

As will be appreciated, the conventional approach for repairing a steel cable conveyor belt is labor and time intensive and may take several days to get the conveyor belt up and running again. This downtime adversely affects the productivity of the facility, especially for large-scale operations that depend on the conveyor belt to carry tons of aggregate or other material every hour.

SUMMARY

In accordance with one aspect of the present disclosure, a fastener is provided for securing to an end of a conveyor belt having cables. The fastener includes a crimp configured to be fixed to a conveyor belt cable and a connector having a unitary, one-piece fastener body. The fastener body has an upper portion for being disposed adjacent an upper surface of the conveyor belt end and a lower portion for being disposed adjacent a lower surface of the conveyor belt end. The upper and lower portions of the fastener body are spaced apart to receive the crimp therebetween and permit the conveyor belt cable to extend in an outboard direction between the upper and lower portions. The connector includes a stop of the connector arranged to block inboard movement of the crimp and the conveyor belt cable fixed thereto. In this manner, the fastener may be used to join the ends of a conveyor belt having cables. The fastener may thereby reduce downtime at a facility by permitting a temporary repair of the conveyor belt without the use of a vulcanization press.

The present disclosure also provides a fastener for a conveyor belt end having a longitudinal cable embedded in belt material. The fastener includes a crimp configured to be secured to the cable and a connector having a fastener body. The fastener body has upper and lower members having ends for being positioned adjacent the belt material. The upper and lower members of the fastener body have a gap therebetween that permits the cable to extend longitudinally between and spaced from the upper and lower members. The connector includes a stop arranged to block movement of the crimp and cable fixed thereto toward the ends of the upper and lower members in the gap between the upper and lower members. The upper and lower members of the fastener body are sized to provide a longitudinal spacing between the ends of the upper and lower members and the crimp. The longitudinal spacing permits the cable to have a strain relief length between the ends of the upper and lower members and the crimp. In the strain relief length of the cable, the wires of the cable may shift relative to one another to relieve stress as the cable bends, such as when the fastener and conveyor belt end travel around a pulley. The ability of the wires of the cable to shift and relieve strain, or move to a position of a lower stress state, increases the durability of the connection between the fastener and the cable, protects the cable in the belt, and improves the strength of a splice utilizing the fastener.

In accordance with another aspect of the present disclosure, a fastener is provided for securing to a conveyor belt end having a cable. The fastener includes a crimp configured to be fixed to the cable and a fastener body. The fastener body has a longitudinally extending upper plate portion, a longitudinally extending lower plate portion, and a loop portion connecting the upper and lower plate portions. The fastener includes a stop body configured to fit between the upper and lower plate portions of the fastener body and abut the crimp with the crimp longitudinally intermediate the stop body and the loop portion. The fastener further includes an attachment member configured to extend through apertures of the upper and lower plate portions of the fastener body and clamp the upper and lower plate portions to the stop body so that the upper and lower plate portions resist movement of the stop body. The stop body abuts the crimp to take up the tension from the cable and the attachment member holds the stop body in clamped engagement in the fastener body. With the fastener body connected to the cable, a hinge pin may be advanced through the loop. In this manner, the fastener provides a durable construct for being attached to the conveyor belt cable that may be used to form a mechanical splice between conveyor belt ends.

The present disclosure also provides a method of securing a fastener to an end of a conveyor belt having cables. The method includes applying a crimp to one of the cables and positioning a stop body on the one cable adjacent the crimp. The method further includes fitting the crimp and stop body between upper and lower portions of a fastener body and securing the fastener body to the stop body. The fastener body has a loop connecting the upper and lower portions for receiving a hinge pin. The method permits a mechanical fastener to be secured to a cable of a conveyor belt end and used to form a splice with the other conveyor belt end, without having to utilize a large vulcanizing press.

DETAILED DESCRIPTION

Figure 1:
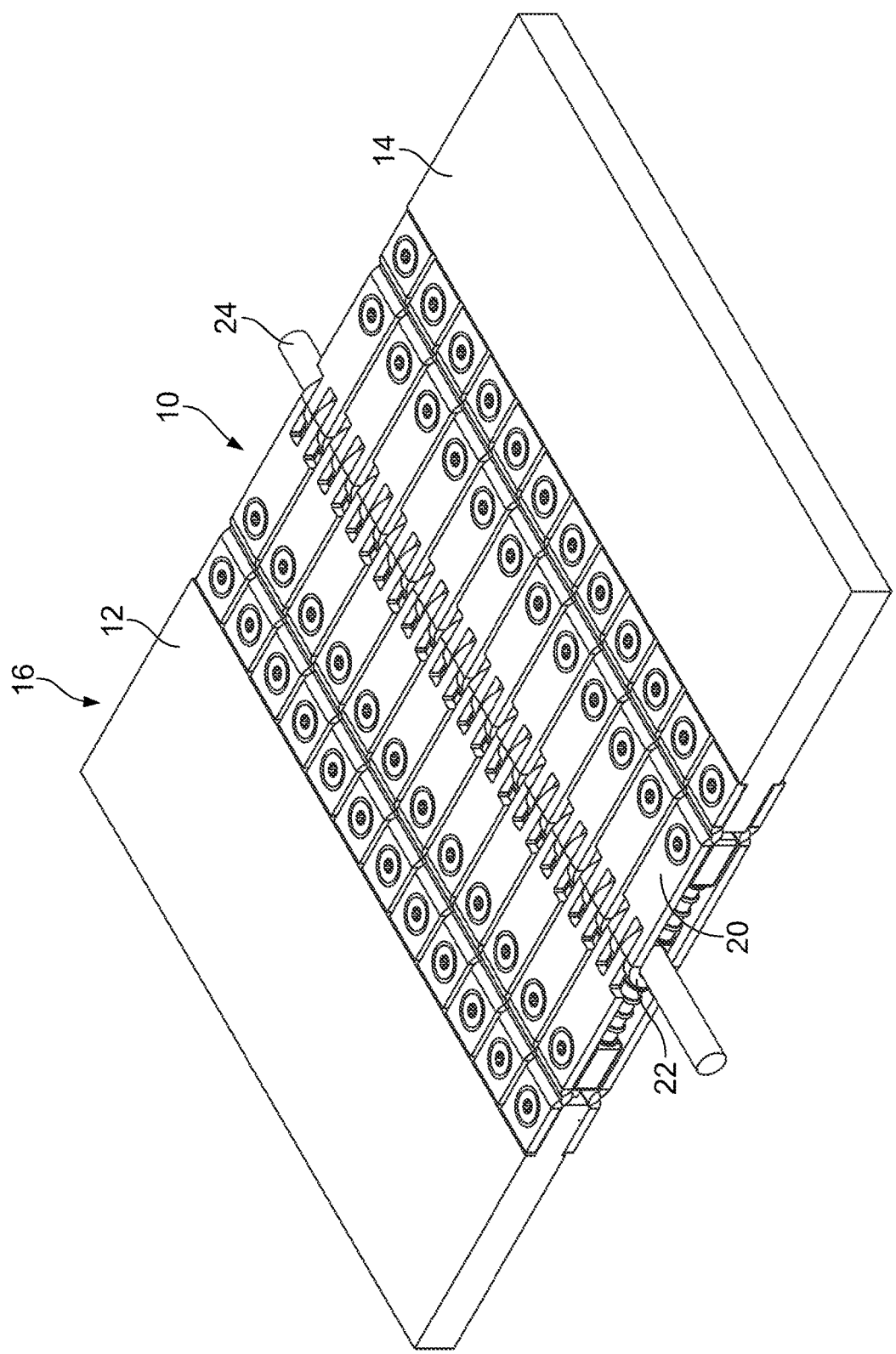
FIG. 1 is a perspective view of a splice including fasteners joined to conveyor belt ends and a hinge pin extending through interlaced loops of the fasteners.

With reference to FIG. 1, a splice 10 for joining ends 12, 14 of a conveyor belt 16 is shown. The splice 10 includes fasteners 20 that are each secured to one of the conveyor belt ends 12, 14 to form a plurality of fasteners 20 on the opposite conveyor belt ends 12, 14. The fasteners 20 each include one or more loops 22 that are interlaced with the loops 22 of the fastener 20 longitudinally aligned therewith. The laced loops 22 define a passageway through which a hinge pin 24 can be inserted to hingedly connect the belt ends. The ends of the hinge pin 24 are shown protruding from the lateral sides of the conveyor belt ends 12, 14 for illustrative purposes but would, in operation, be generally flush with the lateral sides of the conveyor belt ends 12, 14. As the splice 10 travels in a downstream, longitudinal direction, the fasteners 20 can pivot about the hinge pin 24 which provides flexibility to the splice 10.

The conveyor belt 16 is made of one or more layers of an elastomeric material, such as a natural or a synthetic rubber, and includes longitudinally extending cables 30 (see FIG. 13) to provide tensile strength for the belt 16. The cables 30 may be made of steel and are embedded in the rubber of the conveyor belt 16. The conveyor belt 16 has a rated working load limit in the range of 800 PIW to 8,500 PIW. Each fastener 20 is fixed to two of the cables 30, which permits the fastener 20 to have a narrow lateral width so that the fastener 20 readily accommodates troughing of the conveyor belt 16. In other embodiments, each fastener 20 may be fixed to one, three, four, or another number of cables 30 as desired. The components of the fasteners 20 and hinge pin 24 are made of metallic materials, and provide a high-strength, mechanical connection between the cables 30 of the conveyor belt 16. Further, the fasteners 20 may be quickly connected to the cables 30 and used to join the ends of the conveyor belt 16 without having to utilize a vulcanizing press which reduces downtime of the conveyor belt 16. For example, the fasteners 20 may be used to form a hinged splice of the belt 20 in a few hours, such as four to eight hours, using common tools and without special training unlike a vulcanizing process. In some applications, the fasteners 20 may be used only temporarily, such as days or weeks, to keep the conveyor belt 16 running until the repair team can arrive and splice the conveyor belt 16 using a vulcanizing press. In other applications, the fasteners 20 may be employed for longer time periods, such as months.

Figure 2:
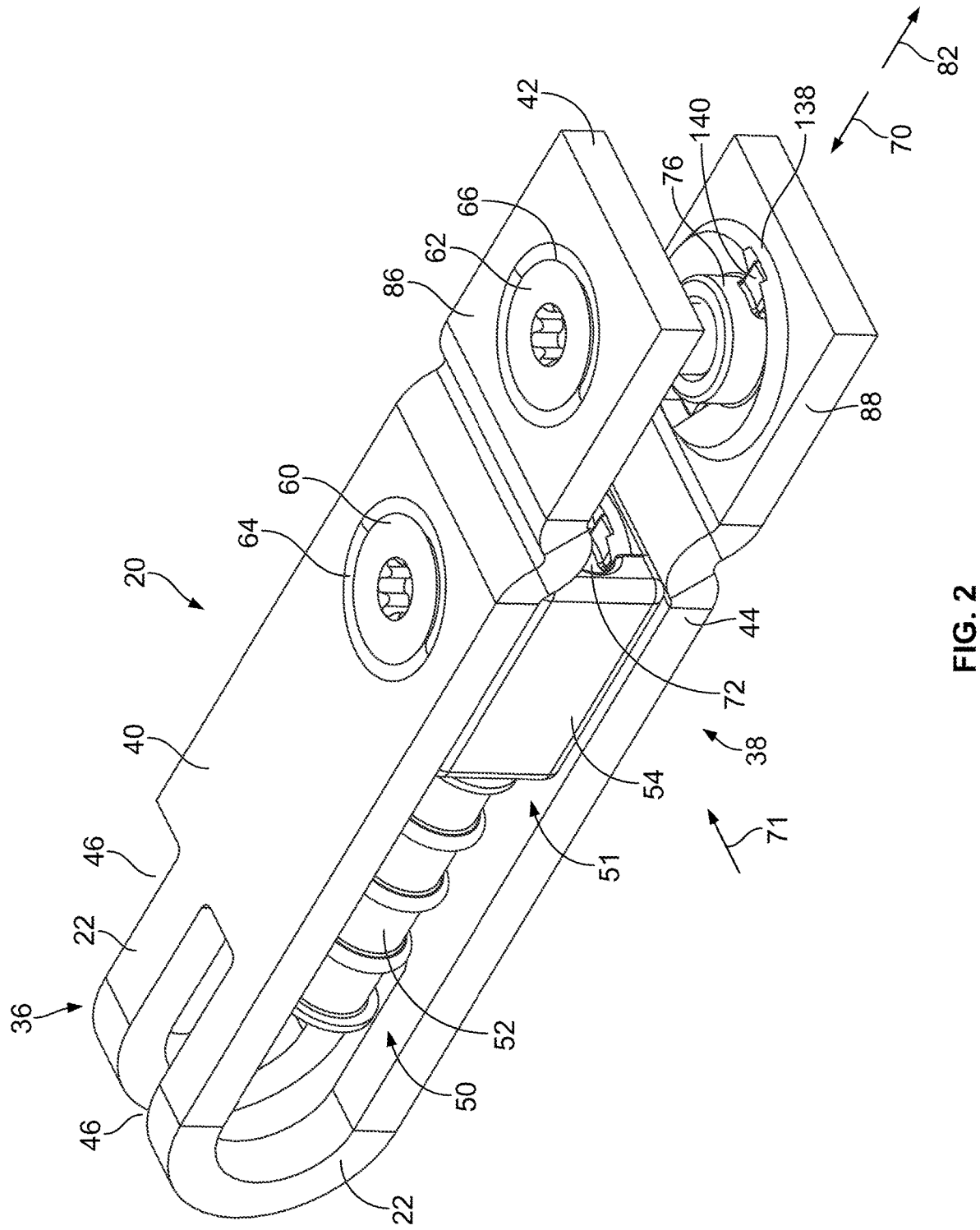
FIG. 2 is a perspective view of one of the fasteners of FIG. 1 showing a fastener body, ferrules, a ferrule support, and bolts.

Regarding FIG. 2, the fastener 20 includes an outboard portion 36 and an inboard portion 38. The fastener 20 includes a fastener body 40 having an upper portion such as an upper plate 42, a lower portion such as a lower plate 44, and one or more loops 22 connecting the upper and lower plates 42, 44. The fastener body 40 includes recesses 46 laterally adjacent the loops 22 for receiving the loops 22 of the longitudinally aligned fastener 20 on the opposite side of the hinge pin 24. The upper and lower plates 42, 44 define therebetween a gap 50 that receives one or more crimps, such as ferrules 52, and the fastener 20 has a stop 51 that limits inboard movement of the ferrules 52 and cables 30 fixed thereto. In one embodiment, the stop 51 includes a stop body such as a ferrule support 54 separate from the fastener body 40. In another embodiment, the stop 51 of the fastener may be a portion of the fastener body 40, as an example.

The ferrules 52 are crimped onto end portions 31 (see FIG. 13) of the cables 30 and portions of the cables 30 exposed from the belt material extend in receptacles, e.g., through openings 72 (see FIG. 9), of the ferrule support 54. The fastener 20 further includes one or more attachment members, such as rivets, screws, or bolts, for extending through openings 64, 66 of the upper plate 42 and through openings 78, 80 of the lower plate 44 and connecting the upper and lower plates 42, 44. In one embodiment, the attachment members include bolts 60, 62 that engage nuts 74, 76 (see FIG. 7) received in the through openings 78, 80 of the lower plate 44. Tightening the bolts 60, 62 causes the upper and lower plates 42, 44 to clamp the ferrule support 54 therebetween. When tension is applied to the cables the ferrules 52 abut the ferrule support 54 and the ferrule support 54 inhibits pull-through in direction 82 (see FIG. 2) of the ferrules 52 and cable end portions 31 secured therein from the fastener body 40.

Figure 7:
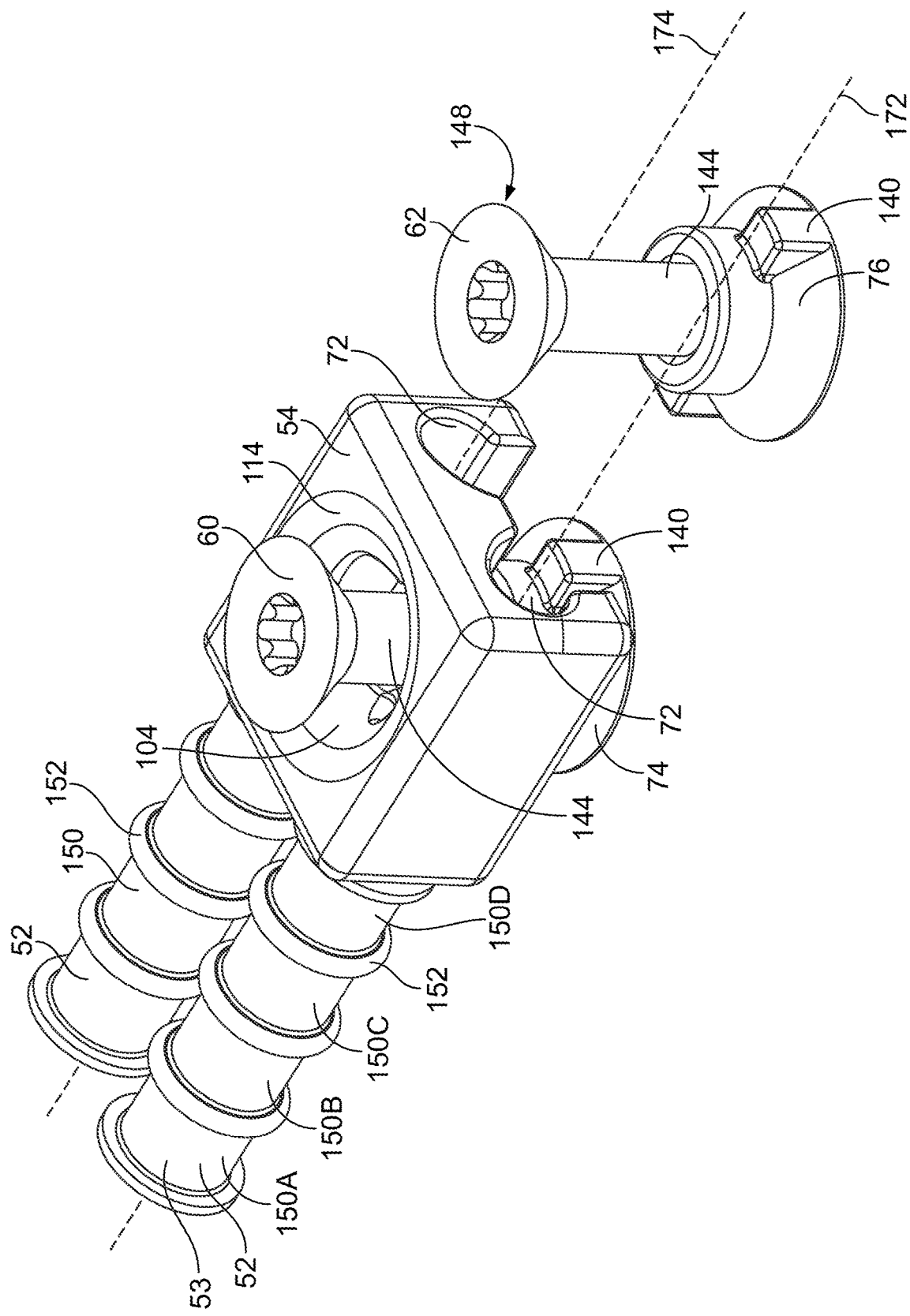
FIG. 7 is a perspective view of the fastener of FIG. 2 with the fastener body removed to show one of the bolts extending through an opening of the ferrule support.

In one embodiment, the ferrules 52 each have an initial, undeformed configuration wherein the ferrule 52 is tubular. The undeformed ferrule 52 may have a sidewall with a circular cross-section so that the ferrule 52 has a cylindrical configuration with a smooth cylindrical outer surface. The inner diameter of the undeformed ferrule 52 is larger than an outer diameter of the end portion 31 of the associated cable 30 to permit the ferrule 52 in the undeformed configuration thereof to be slid on to the cable end portion 31. The ferrule 52 further has a crimped, deformed configuration wherein the ferrule 52 has an inner diameter that is smaller than the inner diameter of the ferrule 52 when the ferrule 52 is in the initial, undeformed configuration. In the deformed configuration, each ferrule 52 has compressed portions 150 separated by flanges such as annular ribs 152 as shown in FIG. 7. The ribs 152 are formed by material flowing away from the deformed compressed portions 150 during the crimping process. The deformed configuration of the ferrules 52 is generally defined by dies of the tool used to deform the ferrules 52 and may be different for different applications.

Figures 8, 9:
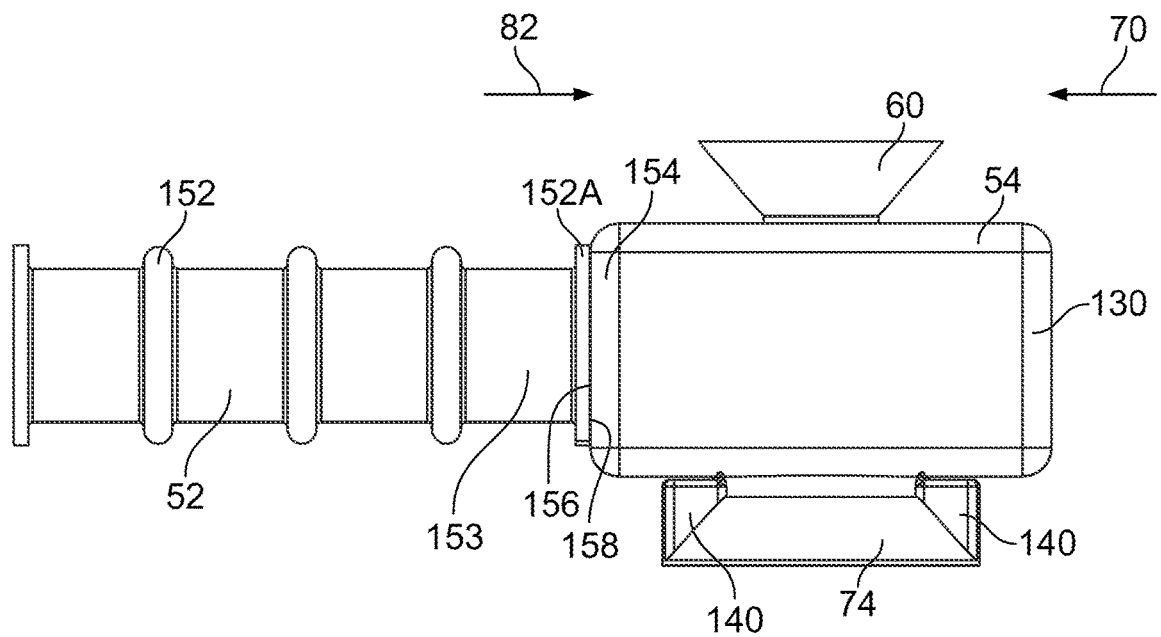
FIG. 8 is a side elevational view of one of the ferrules, one of the bolts, the ferrule support, and one of the nuts showing the ferrules abutting the ferrule support.
FIG. 9 is an end elevational view of the assembly of FIG. 8 showing through openings of the ferrule support aligned with through bores of the ferrules to allow belt cables to extend out from the belt, through the through openings of the ferrule support, and into the ferrules.

With reference to FIG. 8, the crimping process advantageously forms one of the ribs 152A at an inboard end portion 153 of the ferrule 52. The rib 152 has an enlarged, annular surface 156 for abutting a surface 158 of the ferrule support 54 and resisting pull-through of the ferrule 52 and cable 30 secured therein with cups or countersinks 92, 94 and ridges 120, 122 of the plates 42, 44 resisting inboard movement of the ferrule support 54 to keep loading on the bolt 60 to a minimum. Accordingly, the ferrule 52 provides a generally rigid structure on the cable end portion 31 that is enlarged relative to the opening 72 of the ferrule support 54. In this manner, during conveyor belt operation, tension in the splice is transferred from the cables 30 to the ferrule support 54 and the fastener body 40 clamping the ferrule support 54 which, in turn, transfers this loading to the hinge pin 24.

During installation of the fastener 20 on two of the cables 30, the ferrules 52 are first secured to the end portions 31 of the cables 30 by advancing an end portion 31 of each cable 30 in direction 70 (see FIG. 2) into a throughbore 170 (see FIG. 9) of one of the ferrules 52. The ferrules 52 are crimped onto the end portions 31 of the cables 30 by deforming the material of the ferrules 52. The ferrule support 54 is positioned onto the cables 30 so that the cables 30 extend through the two through openings 72 of the ferrule support 54 after the ferrules 52 have been applied to the end portions 31 of the cables 30. In an alternative approach, the ferrule support 54 is positioned on the cables 30 before the ferrules 52 have been applied to the cables 30. In either approach, once the ferrules 52 and ferrule support 54 have been applied to the end portions 31 of the cables 30, the cable end portions 31 with the ferrules 52 and ferrule support 54 thereon are positioned in the gap 50 between the upper and lower plates 42, 44 of the fastener body 40.

In one approach, the fastener body 40 is connected to the assembly of the ferrule support 54, ferrules 52, and cable end portions 31, by advancing the fastener body 40 in longitudinal direction 82 (see FIG. 2). Advancing the fastener body 40 in longitudinal direction 82 engages the ridges 120, 122 of the upper and lower plates 42, 44 with the outboard end of the ferrule support 54 and causes the ferrule support 54 to cam apart the upper and lower plates 42, 44. The fastener body 40 is continued to be advanced in longitudinal direction 82 onto the ferrule support 54 until the ridges 120, 122 are inboard of the ferrule support 54 and the outboard countersinks 92, 94 (see FIG. 4) of the upper and lower plates 42, 44 are aligned with the openings 104, 106 (see FIGS. 7 and 11) of the ferrule support 54. The upper and lower plates 42, 44 then snap back together and the countersinks 92, 94 seat in the openings 104, 106 (see FIGS. 7 and 11) of the ferrule support 54.

Next, a shank portion 144 (see FIG. 7) of the bolt 60 is advanced through the opening 64 of the upper plate 42, through a through opening 104 of the ferrule support 54, and into threaded engagement with the nut 74 that is fixed against rotation in the through opening 78 (see FIG. 6) of the lower plate 44. The shank portion 144 of the bolt 62 is then advanced through the opening 66 of the upper plate 42, into the rubber of the belt 16, between the cables 30, and into threaded engagement with the nut 76 received in the through opening 80 of the lower plate 44. To permit advancing the shank portion 144 of the bolt 62 through the rubber of the belt 16, an installer may predrill a hole in the rubber of the belt 16 to accommodate the bolt 62. Alternatively, the bolt 62 may be provided with a pointed pilot shank detachably mounted to the end of the shank portion 144 to pierce the rubber. As yet another example, the bolt 62 may pilot itself through the rubber if the bolt 62 has an appropriately configured leading end. The bolts 60, 62 are then tightened which causes the upper and lower plates 42, 44 to clamp the ferrule support 54 therebetween and causes end portions 86, 88 (see FIG. 2) of the upper and lower plates 42, 44 to compress a tongue or skived portion 246 (see FIG. 13) of the conveyor belt 16 therebetween.

With the ferrule support 54 clamped between the upper and lower plates 42, 44, the ferrule support 54 is firmly held between the upper and lower plates 42, 44 and the ridges 120, 122 and countersinks 92, 94 of the plates 42, 44 resist movement of the ferrule support 54 and the ferrules 52 in pull-through direction 82 as shown in FIG. 2. Further, the bolt 62 and nut 76 inhibit the separation of the end portions 86, 88 of the upper and lower plates 42, 44 as the conveyor belt 16 travels over pulleys. The engagement between the bolt 62 and the nut 76 also maintains compression of the skived portion 246 of the conveyor belt 16 so that the compressed, skived portion 246 operates as a strain relief that protects the cables 30 from premature fatigue damage in bending.

Figure 3:
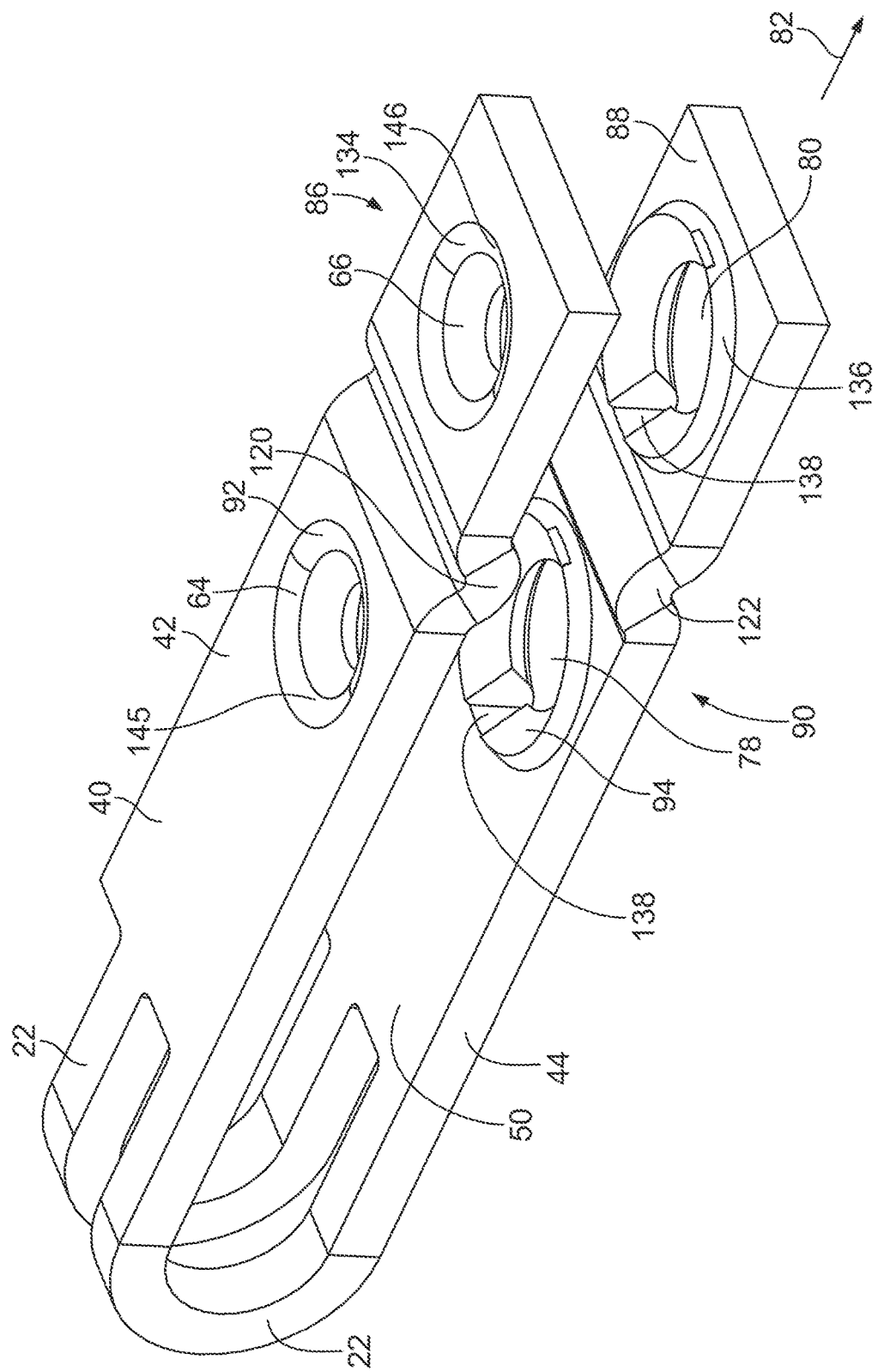
FIG. 3 is a perspective view of the fastener body of FIG. 2 showing an upper plate, a lower plate, and aligned openings of the upper and lower plates that receive the bolts.
Figure 4:
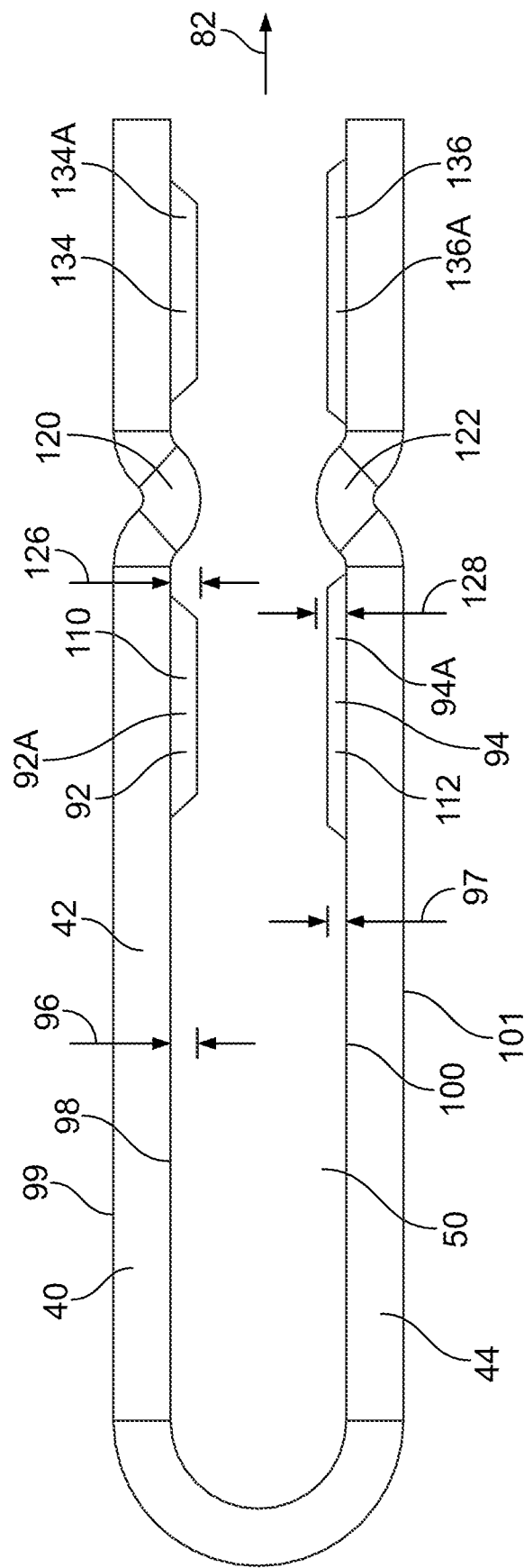
FIG. 4 is a side elevational view of the fastener body of FIG. 3 showing a pair of countersinks and a ridge therebetween of each of the upper plate and the lower plate, the countersinks and ridges extending into the gap between facing surfaces of the upper and lower plates.

With reference to FIGS. 3 and 4, the fastener body 40 includes a ferrule support stop 90 for limiting movement of the ferrule support 54 in pull-through direction 82. In one embodiment, the ferrule support stop 90 includes the countersinks 92, 94 of the upper and lower plates 42, 44 that extend inward distances 96, 97 from inner surfaces 98, 100 of the upper and lower plates 42, 44. The countersinks 92, 94 have a wider inner diameter at outer surfaces 99, 101 of the upper and lower plates 42, 44 and a narrower inner diameter at the inner surfaces 98, 100 of the upper and lower plates 42, 44. The countersinks 92, 94 may be formed by dimpling the material of the upper and lower plates 42, 44 to form annular walls or wall portions 92A, 94A that taper down inwardly into the gap 50. When the ferrule support 54 has been positioned in the gap 50 between the upper and lower plates 42, 44, the countersinks 92, 94 extend into openings 104, 106 (see FIGS. 7 and 11) of the ferrule support 54 so that the countersinks 92, 94 and openings 104, 106 cooperate to form at least a portion of the ferrule support stop 90. The countersink wall portions 92A, 94B have outer surfaces 110, 112 (see FIG. 4) that mate with beveled surfaces 114, 116 (see FIGS. 7 and 11) of the ferrule support 54. The mating fit between the ferrule support 72 and the countersinks 92, 94 rigidly connects the ferrule support 54 to the upper and lower plates 42, 44 once the bolt 60 has been tightened down. Further, the mating fit between the ferrule support 54 and counter sinks 92, 94 of the upper and lower plates 42, 44 and the engagement of the ferrule support 54 against the ridges 120, 122 transfers the tensile load from the cable 30 to the fastener body 40. The bolts 60, 62 are subject to much lower stresses because the bolts 60, 62 only carry the clamping forces and do not carry the tensile load directly. This helps limit back-out or failure of the bolts 60, 62.

With reference to FIGS. 3 and 4, the ferrule support stop 90 further includes one or more protrusions, such as ridges 120, 122 of the upper and lower plates 42, 44. The ridges 120, 122 extend inward by distances 126, 128 from the inner surfaces 98, 100 of the upper and lower plates 42, 44. The distances 126, 128 may be larger than distances 96, 97. When the ferrule support 54 is clamped between the upper and lower plates 42, 44 via the bolt 60, the ferrule support 54 has an inboard facing wall 130 (see FIG. 8) that abuts the ridges 120, 122 and resists pull-through of the ferrule support 54 in direction 82. The ridges 120, 122 effectively reduce the vertical dimension of the gap 50 to an area smaller than the wall 130 of the ferrule support 54 to block the ferrule support 54 from shifting out in direction 82 from between the upper and lower plates 42, 44 of the fastener body 40 as tension is applied to the fastener 20 during conveyor belt operations.

Figure 5:
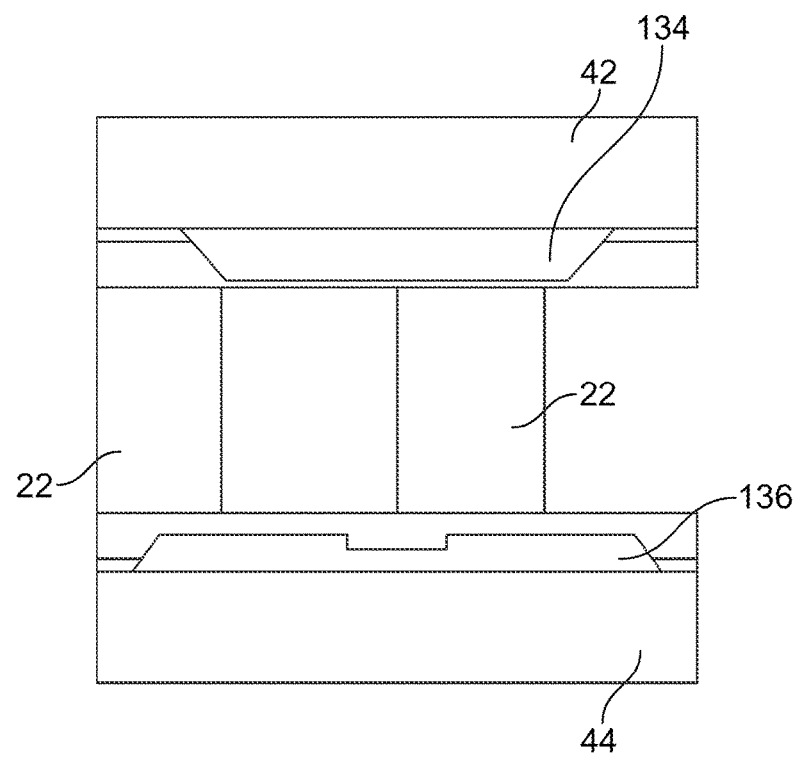
FIG. 5 is an end elevational view of the fastener body of FIG. 3 showing the loops connecting the upper plate and the lower plate.

With reference to FIGS. 3-6, the upper and lower plates 42, 44 include countersinks 134, 136 having tapered annular walls or wall portions 134A, 136A extending about the openings 66, 80 and which receive the bolt 62. The countersinks 92, 134 of the upper plate 42 may have the same or different geometry and the countersinks 94, 136 of the lower plate 44 may likewise have the same or different geometry. Further, the vertically aligned countersinks 92, 94 and 134, 136 may have the same or different geometry. For example, the countersink 136 may be wider than the countersink 134 to accommodate the nut 76 as shown in FIG. 5.

Figure 6:
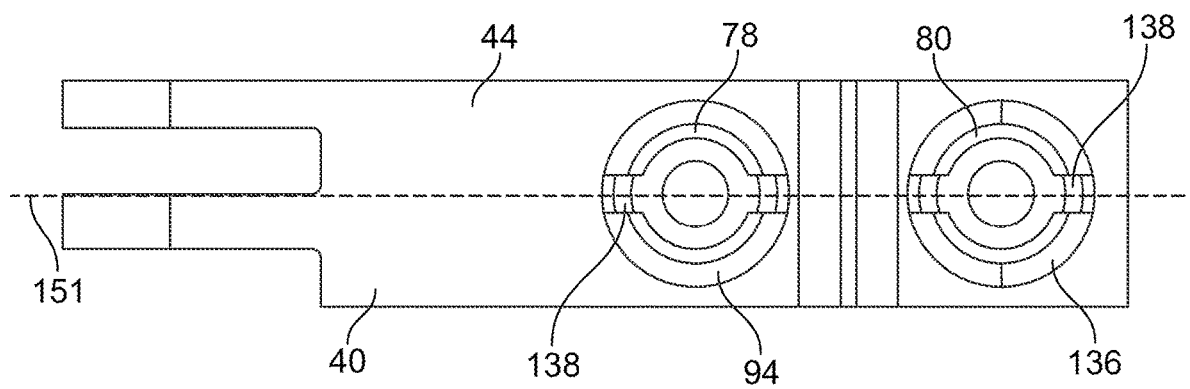
FIG. 6 is a bottom plan view of the fastener body of FIG. 3 showing diametrically opposed recesses in the countersinks of the lower plate for receiving protrusions of nuts that engage the bolts.

With reference to FIG. 3, the countersinks 92, 134 of the upper plate 42 include beveled surfaces 145, 146 extending about the openings 64, 66 against which head portions 148 (see FIG. 7) of the bolts 60, 62 may seat. The countersinks 94, 136 of the lower plate 44 each include one or more recesses 138 sized to receive one or more projections, such as tabs 140 (see FIG. 7) of the nuts as 74, 76. As shown in FIG. 6, the recesses 138 of the countersinks 94, 136 may be diametrically opposed and oriented along a longitudinal axis 151 of the fastener body 40. When the nuts 74, 76 are positioned in the countersinks 94, 136 and the tabs 140 extend in the recesses 138 thereof, the nuts 74, 76 are kept from turning relative to the lower plate 44 as the bolts 60, 62 are turned and threaded into the nuts 74, 76. In one embodiment, the fastener body 40 is provided with the nuts 74, 76 preassembled in the lower plate 44. For example, the nuts 74, 76 may be welded to the lower plate 44. In another approach, the bolts 60, 62 may have one or more projections that engage one or more recesses of the countersinks 92, 134 to limit turning of the bolts 60, 62 relative to the upper plate 42 as the nuts 74, 76 are tightened onto shank portions 144 of the bolts 60, 62.

With reference to FIG. 7, a crimp tool is used to compress the ferrules 52 onto the cables 30. In one embodiment, the tool has dies that form four compressed portions 150A, 150B, 150C, 150D as the tool crimps the ferrule 52 onto the cable 30. The dies may be configured to crimp two ferrules 52 onto two cables 30 at a time. The tool compresses the material of the side wall of the ferrule 52 into the outer strands of the cable 30. The dies of the tool have recesses that permit the compressed material of the side wall to flow radially outward and form the ribs 152. After crimping, the ferrules 52 each have a side wall 53 with the ribs 152 and compressed portions 150 formed therein. In other embodiments, the tool dies may not have recesses such that the deformed ferrules 52 do not have ribs 152. The dies of the crimp tool may include a surface that is positioned against the end of the cable 30 and locates the dies along the cable 30. This makes it easier for an installer to locate the ferrules 52 at uniform locations on the ends of the cables 30.

With reference to FIG. 8, the rib 152A of the ferrule 52 includes the surface 156 and the ferrule support 54 includes a ferrule-facing wall 154 having the surface 158 thereon. When the conveyor belt 16 is placed in tension, the cables 30 pull the ferrules 52 in direction 82 and the hinge pin 24 pulls the fastener body 40 in direction 70. The ferrule support 54 is fixed to the fastener body 40 via the engaged surfaces 110, 114 and 112, 116, the ferrule support 54 abutting the ridges 120, 122, and the upper and lower plates 42, 44 clamping the ferrule support 54 therebetween. As the ferrules 52 are pulled in direction 82 against the wall 154 of the ferrule support 54, the ferrule support 54 applies a reaction force in direction 70 that resists movement of the ferrules 52 in direction 82.

With reference to FIGS. 7 and 9, the ferrules 52 include through bores 170 that receive the cables 30 and the ferrule support 54 includes through openings 72 that are aligned with and open to the through bores 170 of the ferrules 52. The through openings 72 of the ferrule support 54 are configured to form a loose slip-fit with the cables 30 when the ferrule support 54 is initially positioned on the cables 30. Once the fastener 20 has been secured to the cables 70, the through openings 72 are large enough that the ferrule support 54 is spaced from the cables 30 over the outer diameter of the cables 30. The clearance between the ferrule support 54 and the cables 30 permits the cables 30 to move between the upper and lower plates 42, 44 inboard of the connection between the cables 30 and the ferrule 52. As shown in FIG. 7, the ferrules 52 and ferrule support 54 have axes 172, 174 extending through the through openings 72 and through bores 170 along which the cables will extend when the fastener 20 is secured to the cables 30.

With reference to FIG. 9, the ferrule support 54 includes a saddle portion 182 for contacting the cables 30 when the ferrule support 54 is initially positioned on the cables 30. The ferrule support 54 includes an upper wall 180 and curved surfaces 184, 186 extending about the through openings 72 that are contoured to complement and provide clearance from the outer surfaces of the cables 30 when the fastener 20 is secured to the cables 30. The ferrule support 54 includes side walls 190, 192 depending from the upper wall 180 and including ledge portions 194, 196 that extend around the underside of the cables 30. The ferrule support 54 has a lower opening 230 defined between the ledge portions 194, 196. The ferrule support 54 may be connected to a pair of cables 30 by advancing the ferrule support 54 in direction 200 down onto the cables 30 before or after the ferrules 52 have been applied to the cables 30. The ferrule support 54 may be advanced in direction 200 so that both cables 30 enter the lower opening 230 at the same time or may be advanced so that a first cable 30 enters the lower opening 230 before a second cable 30. When one cable 30 is installed at a time, the ferrule support 54 is shifted in direction 200 onto the first cable 30 so that the first cable 30 enters the lower opening 230 and one of the surfaces 184, 186 seats against the first cable 30. The steel cables 30 have a set orientation or pitch in the conveyor belt 16. The term pitch is often used to describe the distance between the center line of one cable 30 to the next cable 30. The ferrule support 54 is configured so that the first cable 30 and a second cable 30 have a lateral width across the cables 30 that is larger than a width 231 (see FIG. 11) of the opening 230. Thus, to position the ferrule support 54 on the second cable 30, the end portion 31 of the second cable 30 is deflected laterally toward the first cable 30 to temporarily decrease the spacing between the end portions 31 of the first and second cables 30 and permit the second cable 30 to be laterally close enough to the first cable 30 to enter the lower opening 230 of the ferrule support 54. The ferrule support 54 is then advanced onto the second cable 30 and the second cable 30 is released by the installer. The second cable 30 resiliently shifts laterally away from the first cable 30 to restore the original pitch of the cables 30. The resilient bias of the cables 30 to return back to their original pitch holds the ferrule support 54 in position on the cables 30. In another approach, the ferrule support 54 may be slid longitudinally onto the cables 30 before connecting the ferrules 52 by advancing the end portions 31 of the cables 30 into the through openings 72 of the ferrule support 54 until the ferrule support 54 is at the desired longitudinal position along the cables 30.

Figure 10:
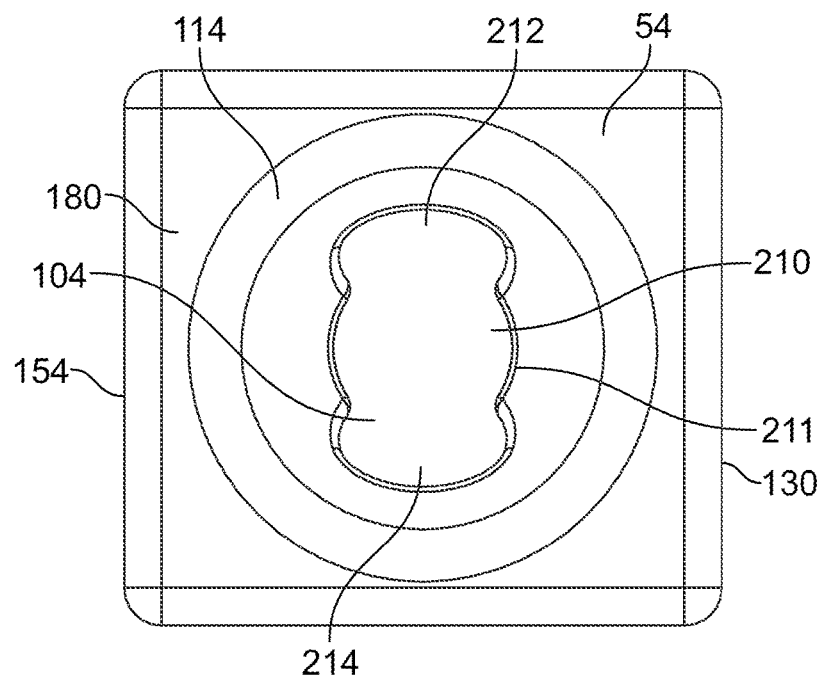
FIG. 10 is a top plan view of the ferrule support of FIG. 9 showing a through opening of the ferrule support that receives one of the bolts.

With reference to FIG. 10, the vertically oriented countersink through opening 104 of the ferrule support 54 may have a non-circular configuration. In one embodiment, the through opening 104 includes a fastener-receiving center portion 210 and lateral side or lobe portions 212, 214. The lobe portions 212, 214 provide clearance for the cables 30 as the cables 30 extend through the ferrule support 54. More specifically, the portion of the ferrule support 54 having the beveled surface 114 thereon extends downwardly and would intersect the outer diameter of the cables 30 if the through opening 104 did not include the lobe portions 212, 214. The lobe portions 212, 214 thereby provide clearance for the cables 30 to seat in the ferrule support 54 without interference from the beveled surface 114. Regarding FIG. 10, the ferrule support 54 has surfaces 211 on opposite sides of the center portion 210. The surfaces 211 are configured to be in clearance with the bolt 60 as the bolt 60 extends through the through opening 104.

Figure 11:
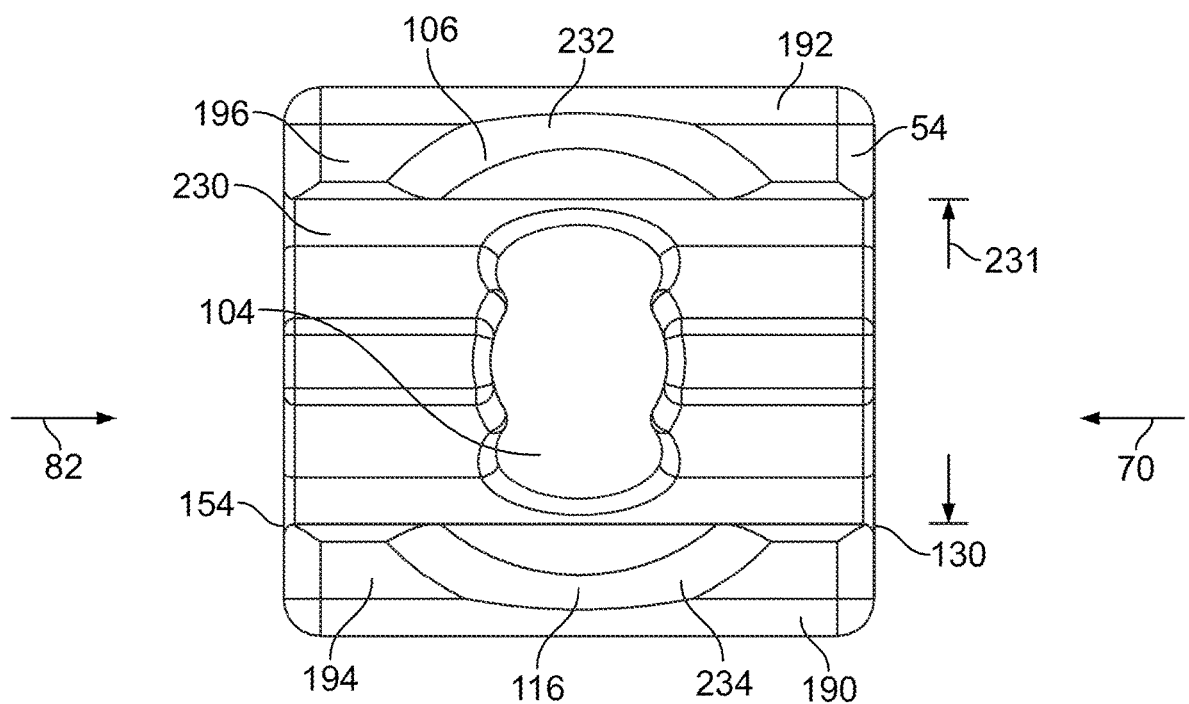
FIG. 11 is a bottom plan view of the ferrule support of FIG. 10 showing seats of the ferrule support that receive the cables.

With reference to FIG. 11, the beveled surface 116 of the ferrule support 54 may include a first portion 232 on the side wall 192 and a portion 234 on the side wall 190. In this manner, the beveled surface portions 232, 234 can engage opposite sides of the countersink 94 of the lower plate 44. The surface portions 232, 234 mate with the outer surface 112 of the countersink 94 and limit longitudinal and lateral movement of the ferrule support 54 relative to the lower plate 44.

With the ferrules 52 and ferrule support 54 on the cables 30, the fastener body 40 may be connected thereto by advancing the fastener body 40 in direction 82 (see FIG. 3) so that the ferrule support 54 engages the ridges 120, 122 and cams apart the upper and lower plates 42, 44. Once the countersinks 134, 136 and ridges 120, 122 of the fastener body 40 have been advanced in direction 82 inboard beyond the ferrule support 54, the ridges 120, 122 shift together inboard of the ferrule support 54 and the countersinks 92, 94 seat in the openings 104, 106 of the ferrule support 54.

Once the fastener body 40 has been connected to the assembly of the ferrule support 54, ferrules 52, and cable end portions 31, the bolts 60, 62 may be advanced through the openings 64, 78 and 66, 80 until the head portions seat against the upper plate 42. Nuts 74, 76 are threaded onto the shank portions 144 of the bolts 60, 62 and tightened down which draws the nuts 74, 76 against the lower plate 44. Tightening down the nuts 74, 76 unifies the fastener 20 and applies pressure to the belt material between the upper and lower plates 42, 44.

Figure 12:
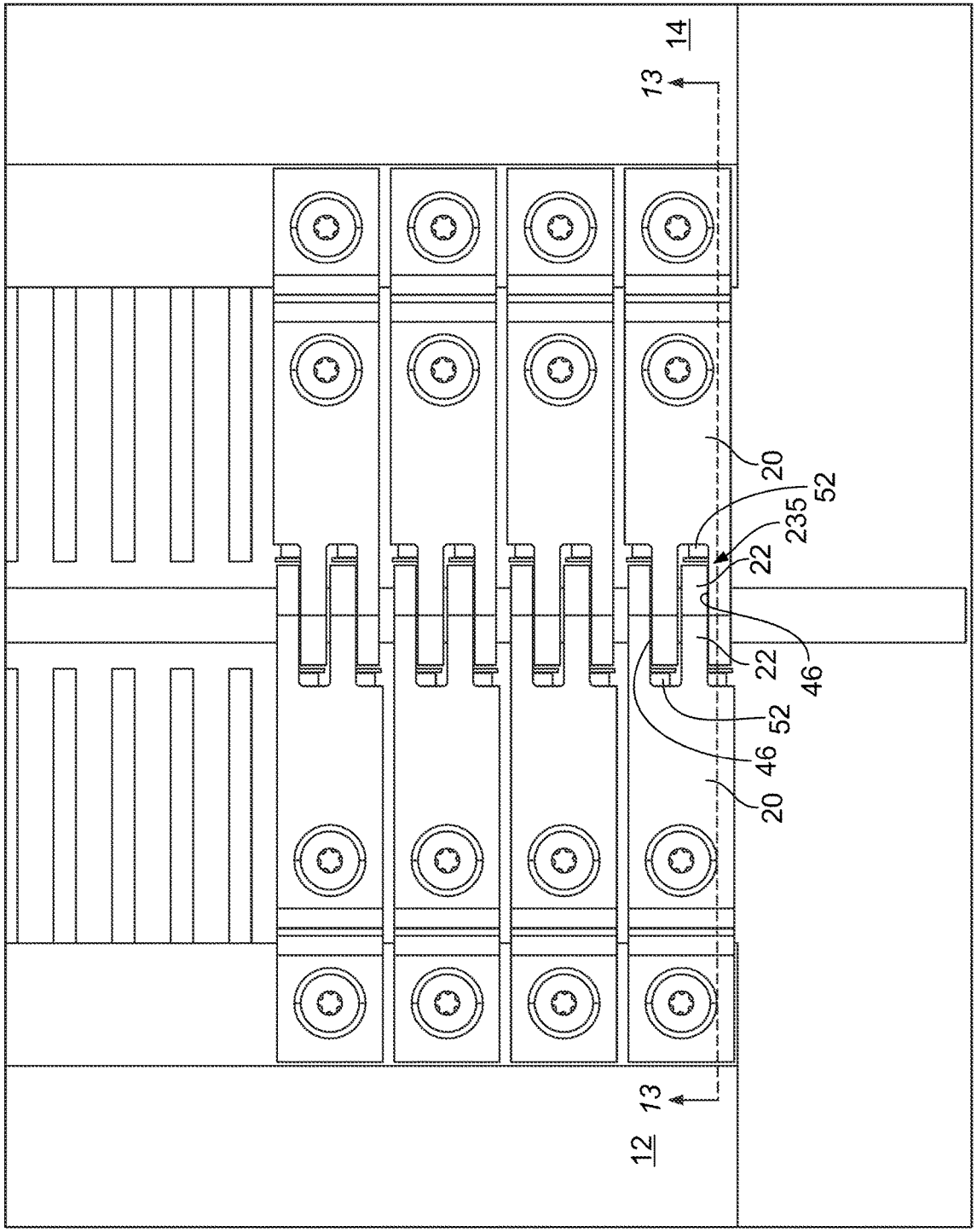
FIG. 12 is a top plan view of a portion of the splice and conveyor belt ends of FIG. 1 showing loops of the fasteners laced about the hinge pin.
Figure 13:
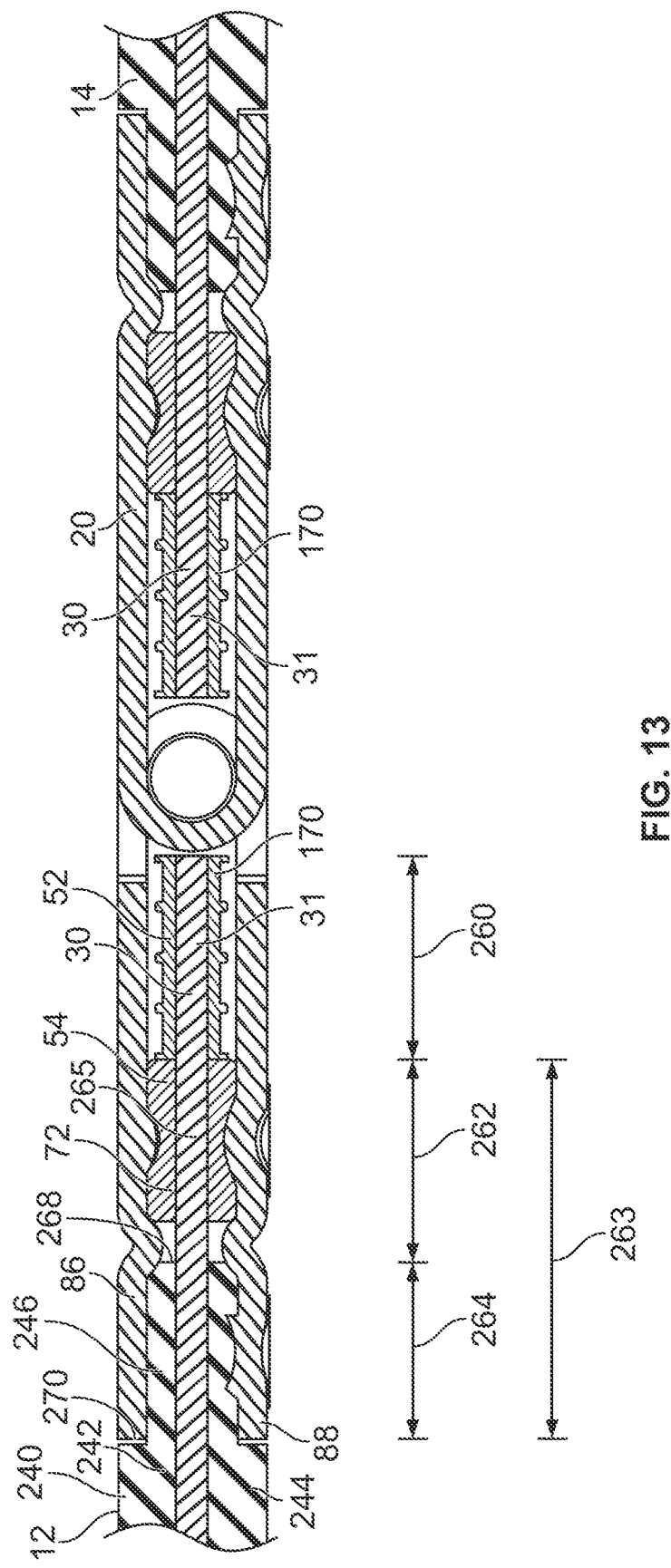
FIG. 13 is a cross-sectional view taken across line 13-13 of FIG. 12 showing fasteners secured on the conveyor belt ends and cables of the conveyor belt ends extending through the ferrule supports into the ferrules of the fasteners.

With reference to FIGS. 12 and 13, the fasteners 20 are shown secured to the conveyor belt ends 12, 14 with the loops 12 of each of the fasteners 20 secured to one belt end 12, 14 received in the recesses 46 of the longitudinally aligned fastener 20 secured to the other belt end 12, 14. The splice 10 includes longitudinal gaps 235 between each loop 22 of each fastener 20 secured to the conveyor belt end 12 and the longitudinally aligned ferrule 52 of the fastener 20 secured to the other conveyor belt end 14. The loops 22 of the fasteners 20 secured to the conveyor belt end 14 are similarly spaced from longitudinally aligned ferrules 52 of the fasteners 20 secured to the conveyor belt end 12.

With reference to FIG. 13, each conveyor belt end 12, 14 includes an upper cover portion 240, an intermediate portion 242 that includes the cables 30, and a lower cover portion 244. The material of the upper and lower cover portions 240, 244 may have different characteristics than the rubber of the intermediate portion 242. For example, the upper and lower covers 240, 244 may have enhanced resistance to chemicals and/or ultraviolet light. The conveyor belt 16 may contain reinforcing structures in addition to the cables 30, such as fabric or textiles.

The ends 12, 14 may be formed by cutting the conveyor belt 16. The conveyor belt 16 and cables 30 therein may be cut, for example, using an angle grinder. Before applying the fasteners 20 to the conveyor belt ends 12, 14, a skiving operation is performed to remove sections of the upper and lower cover portions 240, 244. This leaves a skived portion 246 of each conveyor belt end 12, 14. The skived portion 246 of the belt ends 12, 14 includes material of the intermediate portion 242 encasing the cables 30.

Next, the user cleans the material of the intermediate portion 242 off of the cables 30 including the end portions 31 thereof. This cleaning may be performed, for example, using a tool with an oscillating blade, a hand knife with a hooked blade and/or a grinding tool with a wire brush.

The ferrules 52 are positioned on the now-exposed end portions 31 of the cables the ferrules 52 are crimped, the ferrule supports 54 are connected to the cables 30, and the remaining components of the fastener 20 are assembled onto the cables 30 as discussed above. The skived portion 246 of each belt end 12, 14 is clamped between the inboard end portions 86, 88 of the upper and lower plates 42, 44 with tightening of the bolts 60, 62.

Each cable 30 includes a plurality of filaments or wires. In one embodiment, the wires are grouped together in bundles of wires with each wire extending helically in the bundle. In one embodiment, the cable 30 includes seven bundles of seven wires each. The seven bundles include one central bundle and six peripheral bundles in a helical arrangement around the central bundle. As the conveyor belt bends, such as going around a pulley, the wires of the cable 30 can slide past each other and move about each other to reduce the stress level in the strands of the cable 30.

Each fastener 20 provides a length 260 of cable 30 engaged with the ferrule 52. Each fastener 20 further provides a length 262 of each cable 30 extending from the ferrule 52 to the skived portion 246. The length 262 may vary from cable 30 to cable 30 due to user error although such variance is not desired or intended. The sum of the lengths 260 and 262 may be in the range of two inches to three inches, such as approximately 2.5 inches. Further, each fastener 20 provides a length 264 of the cable 30 from an outboard edge 268 of the skived portion 246 to an inboard edge 270 of the upper and lower plates 42, 44 at the fastener inboard portion 38. The length 264 may be in the range of 0.5 inches to 1.5 inches, such as approximately one inch.

The cables 30 hold tension while in a bent shape such as when the splice 10 goes around a pulley. The individual wires of the cables 30 can move relative to each other to a position of lower stress which permits bending of the cables 30 without stress in the cables 30 exceeding safety limits. The action of crimping the ferrule 52 onto one of the cables 30 effectively fixes an end section of all of the wires of the cable 30 within the ferrule 52 from moving and relieving stress as the cable 30 bends.

It has been found that the movement of the conveyor belt 12 over pulleys results in the fasteners 20 bending the cables 30 generally at the inboard edges 270 of the upper and lower plates 42, 44. The bending of the cables 30 causes deformation in the cable in the form of wires of the cable 30 sliding past each other or otherwise adjusting the positions of the wires to reduce the stress level therein. The upper and lower plates 42, 44 are longitudinally sized to provide a distance 263 between the inboard the edge 270 of the upper and lower plates 42, 44 and the ferrule 52. The distance 263 provides a strain relief length 265 of each cable 30 extending longitudinally between the inboard edge 270 and the ferrule 52. The strain relief length 265 provided by the upper and lower plates 42, 44 moves the deformation in the cable 30 due to bending farther away from the ferrule 52. This reduces fatigue of the crimped end portion 31 of the cable 30 because the deformation is occurring farther away from the crimped end portion 31 of the cable 30 at locations where the wires of the cable 30 can move relative to each other and relieve stress, which improves the durability of the connection between the fastener 20 and the cable 30. Further, the skived portion 246 of the belt end 12, 14 is compressed between the inboard end portions 86, 88 of the upper and lower plates 42, 44. The compressed material of the skived portion 246 acts as a shock absorber to accommodate the loading applied to the upper and lower plates 42, 44 as the upper and lower plates 42, 44 travel around pulleys.

Preferably, the components of the fastener 20 are of metallic materials. In one embodiment, the fastener body 40 is made of 304 stainless carbon steel, the ferrule support 54 is made of medium carbon steel, the ferrules 52 are made of copper or stainless steel, the bolts 60, 62 are made of steel, and the nuts 74, 76 are made of steel. Other materials for these components may be employed. The bolts 60, 62 may take the form of a flat head screw. The hinge pin 24 may be a nylon-covered steel cable having braided steel wires.

In one embodiment, the fastener body 40, ferrule support 54, and bolts 60, 62 are made of steel and the ferrules 52 are made of copper that is less rigid or is softer than the steel of the nearby components. Once the fastener 20 has been installed on a pair of cables 30, significant tension loads are applied to the cables 30 which firmly engages the end portions 153 of the ferrules 52 with the ferrule support 54. In some instances, the pair of ferrules 52 of a fastener 20 are positioned on the pair of cables 30 by an installer at different longitudinal positions along the belt 16 so that one ferrule 52 is more outboard and the other ferrule 52 is more inboard relative to the rubber of the belt 16. This situation may occur when, for example, one of the cables 30 is cut shorter than the other cable 30 or the installer crimps the ferrules 52 at different longitudinal positions along the cables 30.

In these longitudinally misaligned situations, the outboard ferrule 52 is spaced from or not fully engaged with the ferrule support 54 such that the cable 30 of the outboard ferrule 52 is under a significantly lower tensile load than the cable 30 of the inboard ferrule 52. The inboard ferrule 52 transfers the tensile load from the associated cable 30 and the material of the belt surrounding the cable 30 of the outboard ferrule 52 to the ferrule support 54. The higher tensile load in the cable 30 of the inboard ferrule 52 compresses the end portion 153 of the inboard ferrule 52 against the ferrule support 54. The end portion 153 of the inboard ferrule 52 is therefore subjected to compressive stress due to the engagement with the ferrule support 54 that is greater than if both ferrules 52 were engaged with the ferrule support 54. It is believed that the softer material of the ferrules 52 permits the end portion 153 of the inboard ferrule 52 to compress longitudinally and effectively take up the difference in the longitudinal positions of the ferrules 52 along the belt 16. In other words, the high stress imparted to the inboard ferrule 52 shortens the ferrule 52 until the outboard ferrule 52 engages the ferrule support 54 and starts to transfer tensile loads from the cable 30 of the outboard ferrule 52 to the ferrule support 54. In this manner, the deformation of the end portion 153 of the more inboard ferrule 52 compensates for the longitudinal misalignment of the ferrules 52 on the cables 30. This is advantageous because too much tension in one cable 30 while too little tension in the other cable 30 can contribute to mistracking of the conveyor belt 16.

Figure 14:
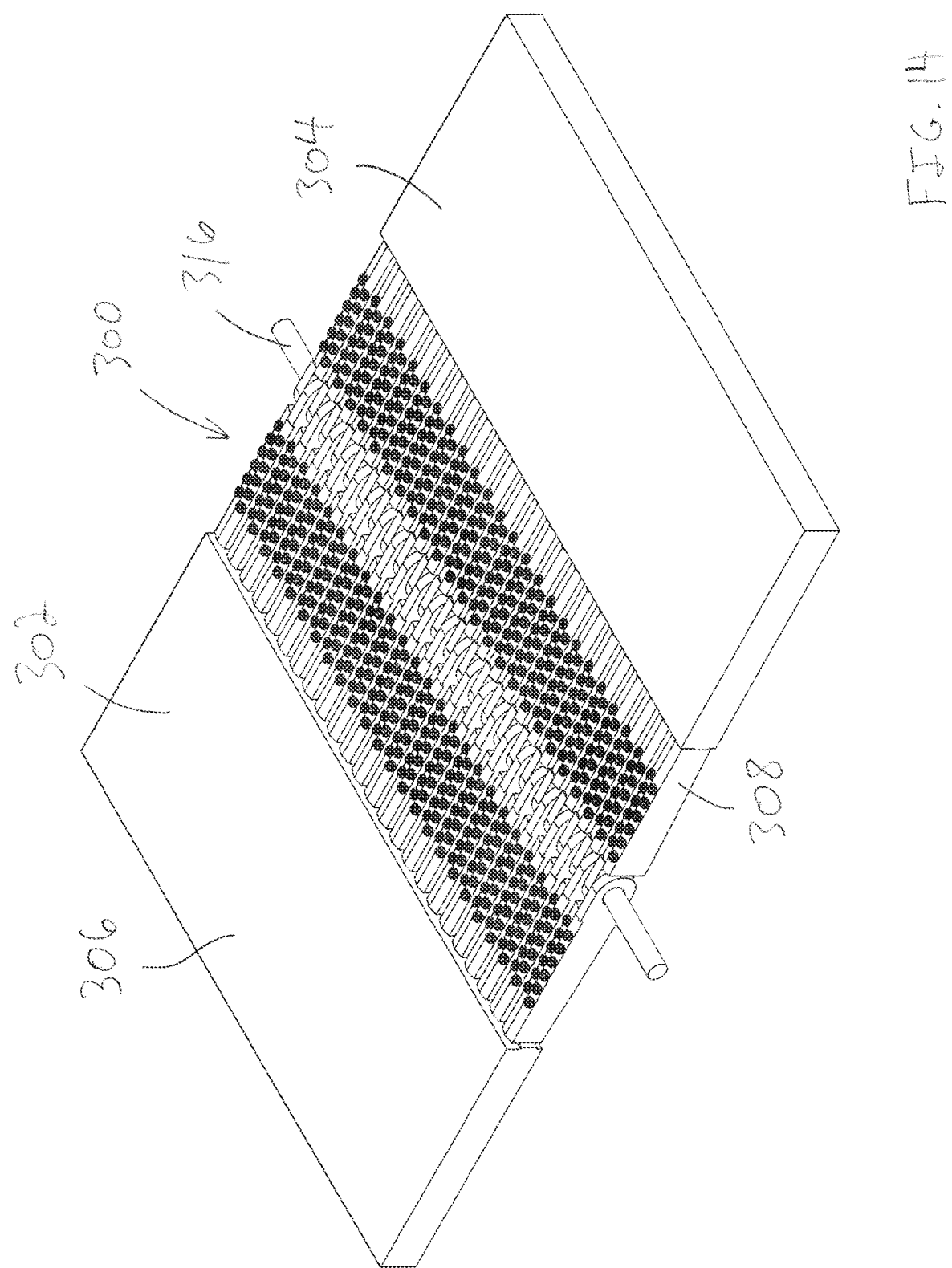
FIG. 14 is a perspective view of another splice for joining conveyor belt ends.

With reference to FIG. 14, another splice 300 is provided for joining ends 302, 304 of a conveyor belt 306. The splice 300 include fasteners 308 that are each connected to one of the cables 310 (see FIG. 22) of the conveyor belt ends 302, 304. Regarding FIG. 15, each fastener 308 is secured to the respective cable 310 and has a loop 312 with an opening 314 that receives a hinge pin 316 of the splice 300. Each fastener 308 includes a hinge portion 320 having the loop 312 and a cable-receiving portion 322 for receiving and being secured to one of the cables 310. The fastener 308 includes a fastener body 324 that may be elongated and includes a longitudinal opening, such as a blind bore 326, sized to receive an end portion 328 of the cable 310 as the cable end portion 328 is advanced in direction 330 into the blind bore 326. Regarding FIGS. 15 and 18, the fastener body 324 has a generally rectangular block-like shape that is narrower in the lateral direction than the fastener body 324 is tall in the vertical direction. The narrow configuration of the fastener body 324 permits the splice 300 to accommodate troughing of the conveyor belt 306.

The fastener 308 includes a first cable locking assembly 332 and a second cable locking assembly 334 that operate laterally side-by-side to one another to secure the cable 310 in the blind bore 326. In one embodiment, the first and second cable locking assemblies 332, 334 each include one or more locking members, such as set screws 340, received in apertures 342 in an upper wall portion 372 of the fastener body 324. The set screws 340 have rotary drive structures 343 for receiving a driver, such as an Allen driver bit of a power tool, and a leading end portion 344 (see FIG. 20) for compressing the cable 310 against a portion 350 (see FIG. 17) of a surface 351 the bore 326 and capturing the cable 310 within the blind bore 326.

Figure 15:
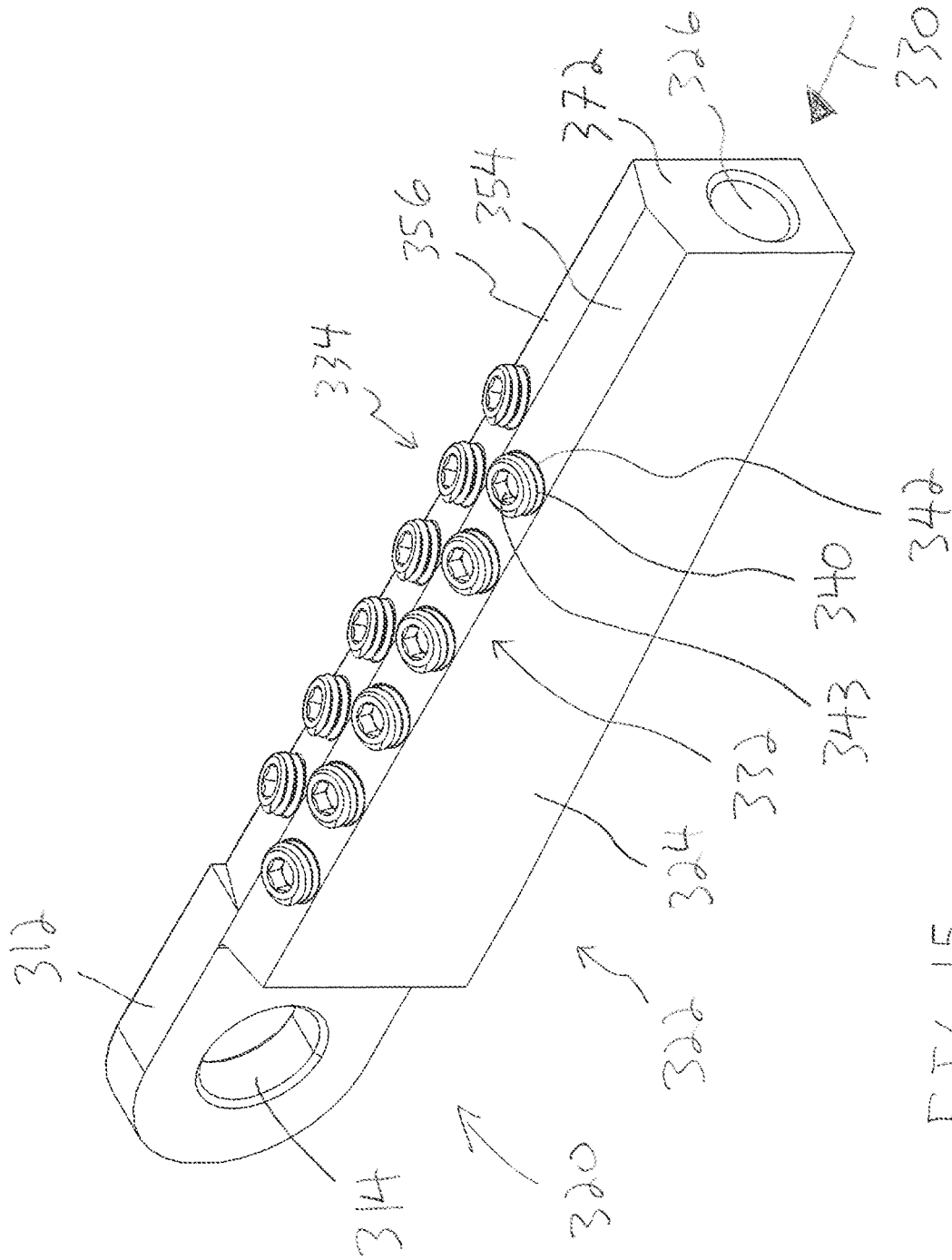
FIG. 15 is a perspective view of one of the fasteners of the splice of FIG. 14 showing a longitudinal bore for receiving a cable of one of the conveyor belt ends and set screws for securing the cable within the fastener.
Figure 16:
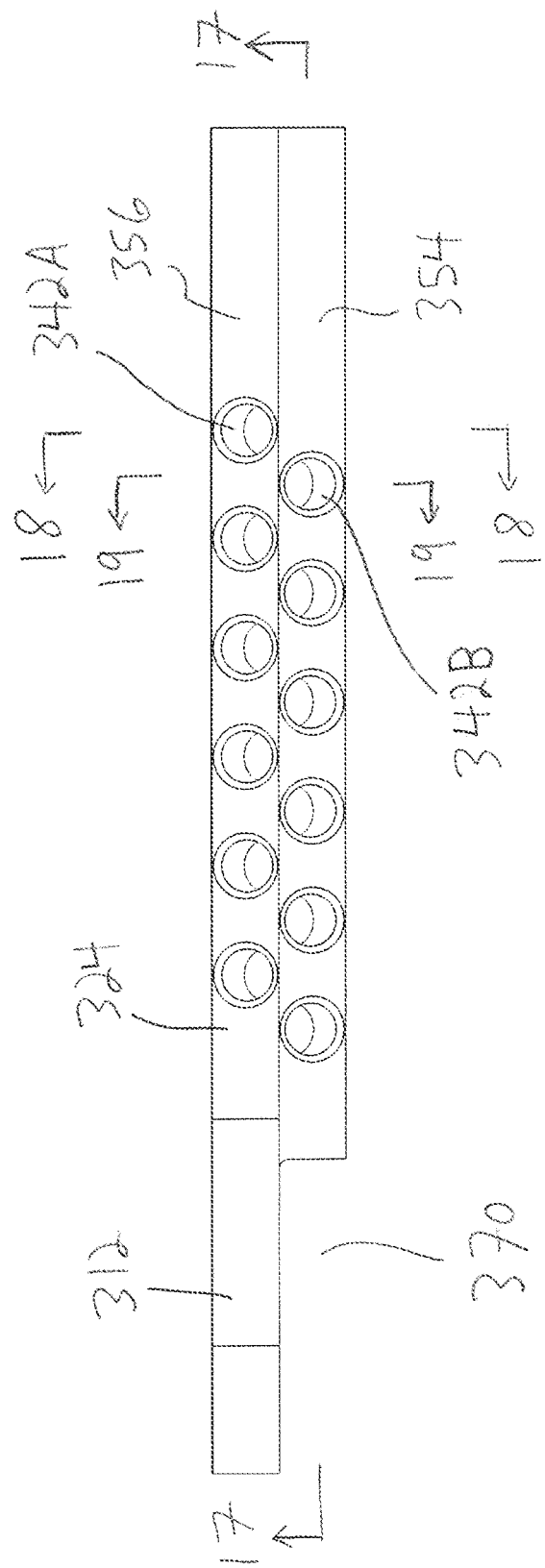
FIG. 16 is a top plan view of a fastener body of the fastener of FIG. 15 showing two rows of apertures for receiving the set screws.
Figure 18:
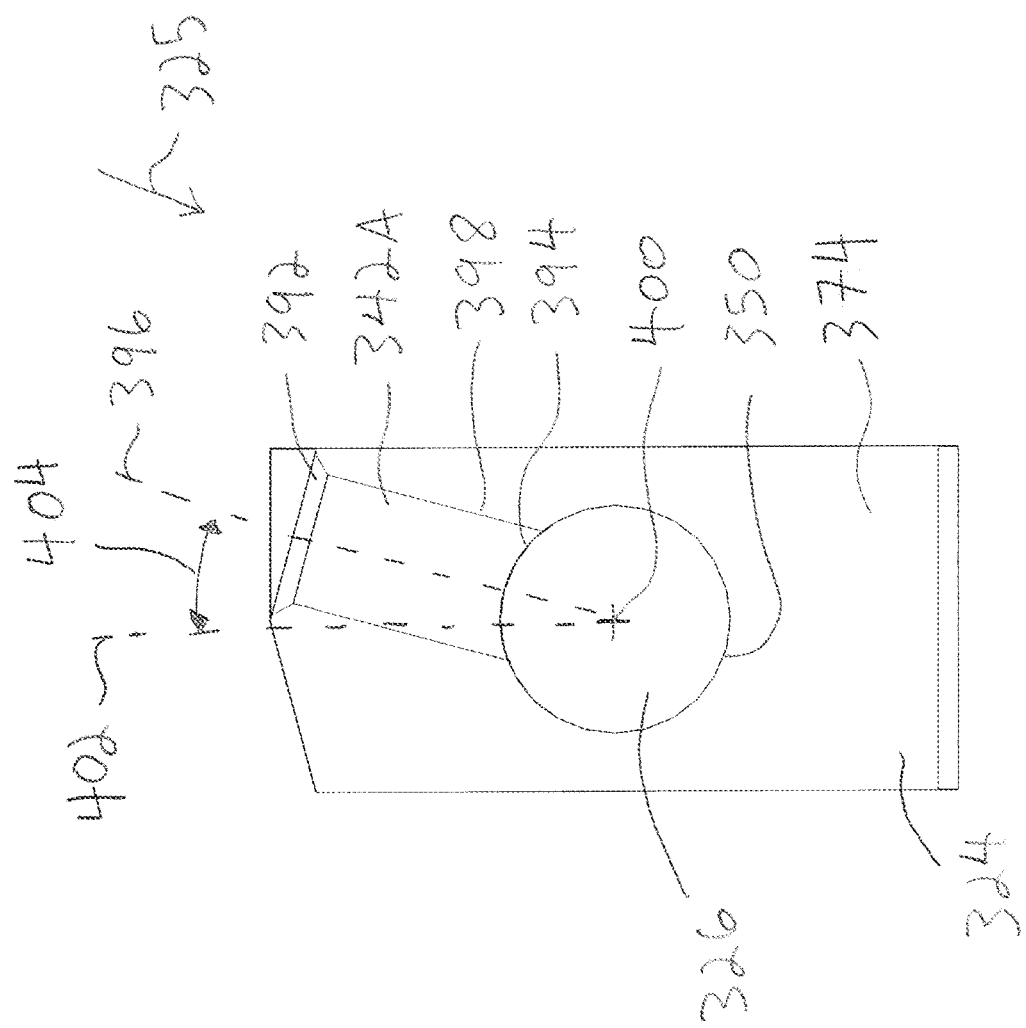
FIG. 18 is a cross-sectional view taken across line 18-18 of FIG. 16 showing the orientation of an aperture of the second row of apertures that opens to the bore of the fastener body and permits the set screw in the aperture to press the cable against a lower wall of the fastener body across the bore from the aperture.

With reference to FIGS. 15, 16, and 18, the upper wall of the fastener body 324 includes upper surfaces 354, 356 that extend transversely to one another. With the transverse orientation of the upper surfaces 354, 356, the apertures 342 in the surfaces will extend obliquely to one another so that the set screws 340 therein apply a somewhat zigzag pattern of contact against the cable 310 as discussed in greater detail below.

Figure 17:
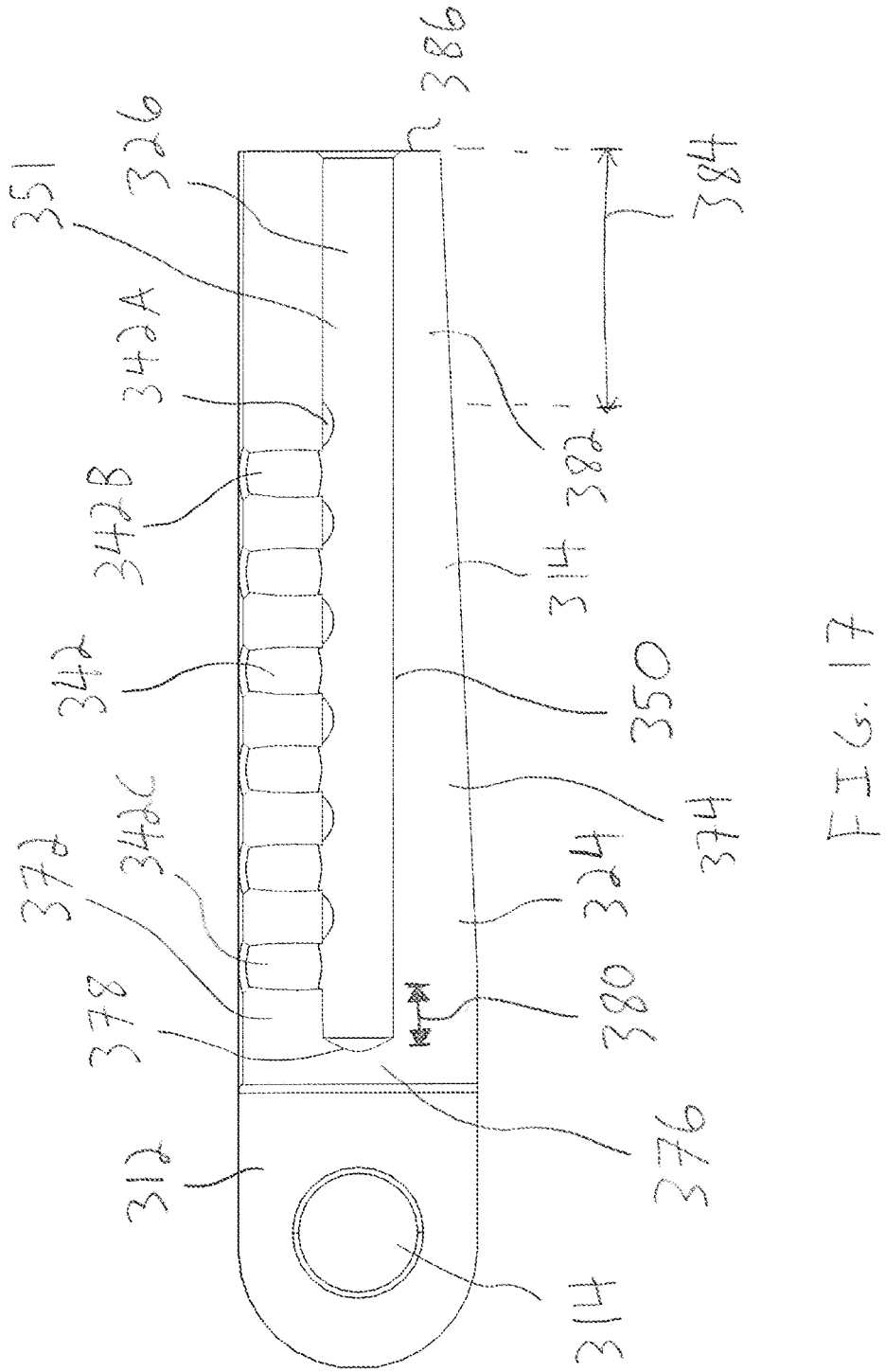
FIG. 17 is a cross-sectional view taken across line 17-17 of FIG. 16 showing the first row of apertures opening to the bore of the fastener body.

With reference to FIGS. 16 and 17, the fastener body 324 includes a recess 370 so that with the fastener 308 secured to one belt end, the fastener recess 370 can receive the loop 312 of a longitudinally aligned fastener 308 secured to the other belt end. The fastener body 324 includes the upper wall portion 372 having the apertures 342 formed therein and a lower wall 374 which includes the bore surface portion 350 against which the cable 310 is compressed by the set screws 340. The upper wall portion 372 and the lower wall portion 374 cooperate to form the bore 326 with each of the wall portions 372, 374 having a portion of the surface 351 of the bore 326. The fastener 324 includes an end wall portion 376 forming a closed end 378 of the blind bore 326. The end wall portion 376 of the fastener body 324 spaces the closed end 378 by a distance 380 from the aperture 342C. The distance 380 permits the set screw 340 in the aperture 342C to engage wires of the cable 310 spaced from the ends of the wires of the cable 310, which tend to splay apart when compressed, to increase the strength of the connection between the set screw 340 in the aperture 342C and the cable 310.

With reference to FIG. 17, the fastener body 324 further includes a spacer portion 382 that extends a distance 384 between an aperture 342A and an inboard end 386 of the fastener body 324. It has been observed that the cable 310 bends near the inboard end 386 of the fastener 308. The distance 384 provided by the spacer portion 382 moves the stress concentration due to the bending away from the apertures 342A, 342B and the set screws 340 therein that engage the cable 310. The distance 384 provides bend or strain relief by moving the bending point of the cable 310 away from the tightly secured bundles of wires of the cable 310.

Figure 19:
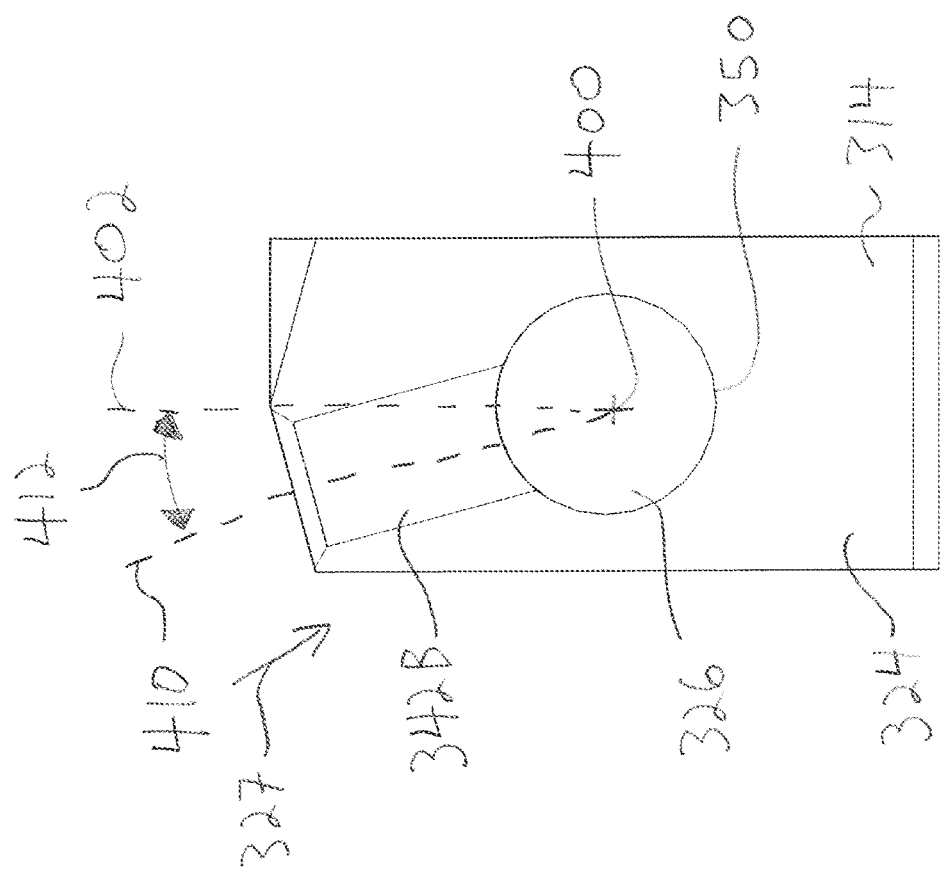
FIG. 19 is a cross-sectional view taken across line 19-19 in FIG. 16 showing the orientation of an aperture of the first row of apertures that permits the set screw therein to enter the bore and press the cable against a lower wall of the fastener body across the bore from the aperture.

With reference to FIGS. 18 and 19, the apertures 342 have an alternating orientation relative to a vertical axis 402 of the fastener body 324. More specifically, with reference to FIG. 18, the aperture 342A has an inlet opening 392, an outlet opening 394, and a central aperture axis 396 extending between the inlet opening 392 and the outlet opening 394. The fastener body 324 includes an aperture surface 398 extending about the aperture 342A and including threads for engaging the set screw 340. The blind bore 326 has a central longitudinal axis 400 extending perpendicular to the vertical axis 402 of the fastener body 324. The aperture central axis 396 extends at an angle 404 relative to the vertical axis 402. Thus, as the set screw 340 is driven in direction 325 along the aperture central axis 396, the set screw 340 compresses the cable 310 against the bore surface portion 350.

With reference to FIG. 19, the aperture 342B likewise has an aperture central axis 410 oriented at an angle 412 relative to the vertical axis 402 of the fastener body 324. The angle 412 may be the same or different as the angle 404. As shown in FIG. 19, the set screw 340 is driven in direction 327 along the aperture central axis 310 to engage the cable 310 and compress the cable 310 against the bore surface portion 350.

Figure 20:
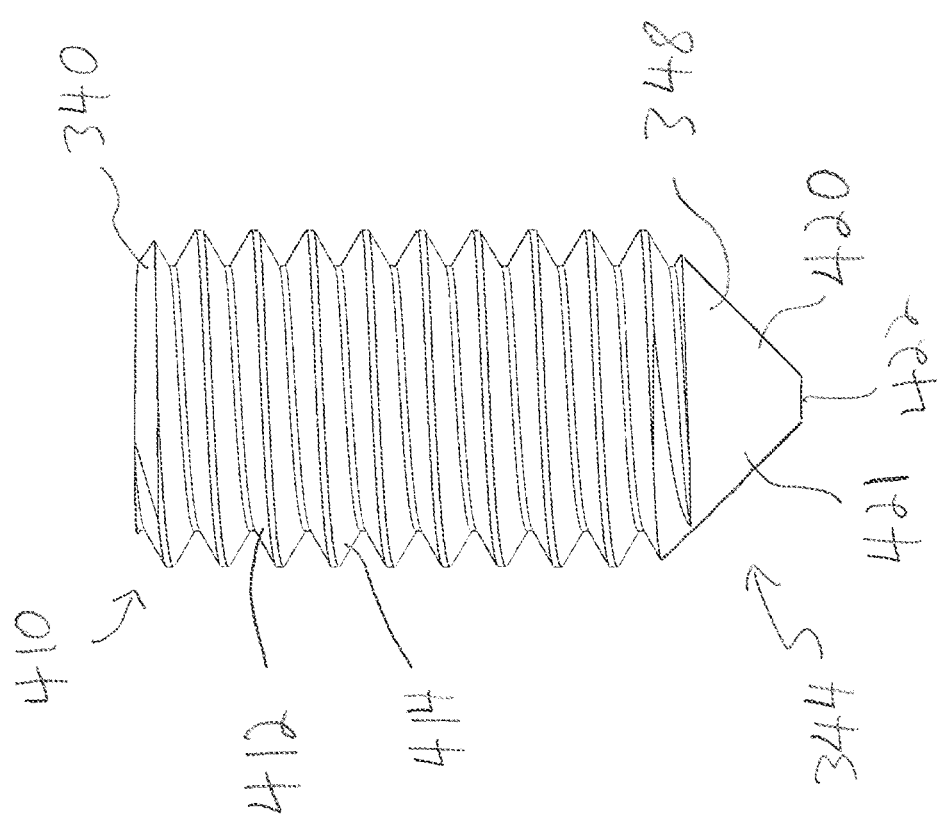
FIG. 20 is an elevational view of one of the set screws of the fastener of FIG. 15 showing a lower nose of the set screw.

With reference to FIG. 20, each set screw 340 includes a trailing end portion 410 that includes the rotary drive structure 343 and a body 412 having threads 414. The leading end portion 344 of the set screw 340 includes the nose 420 for contacting the cable 310. The nose 420 may have a frustoconical surface 421 that wedges between bundles of wires of the cable and helps secure the set screw 340 to the cable 310. The nose 420 may also include a flat surface 422 which applies a focused, compressive force on the cable 310.

Figure 21:
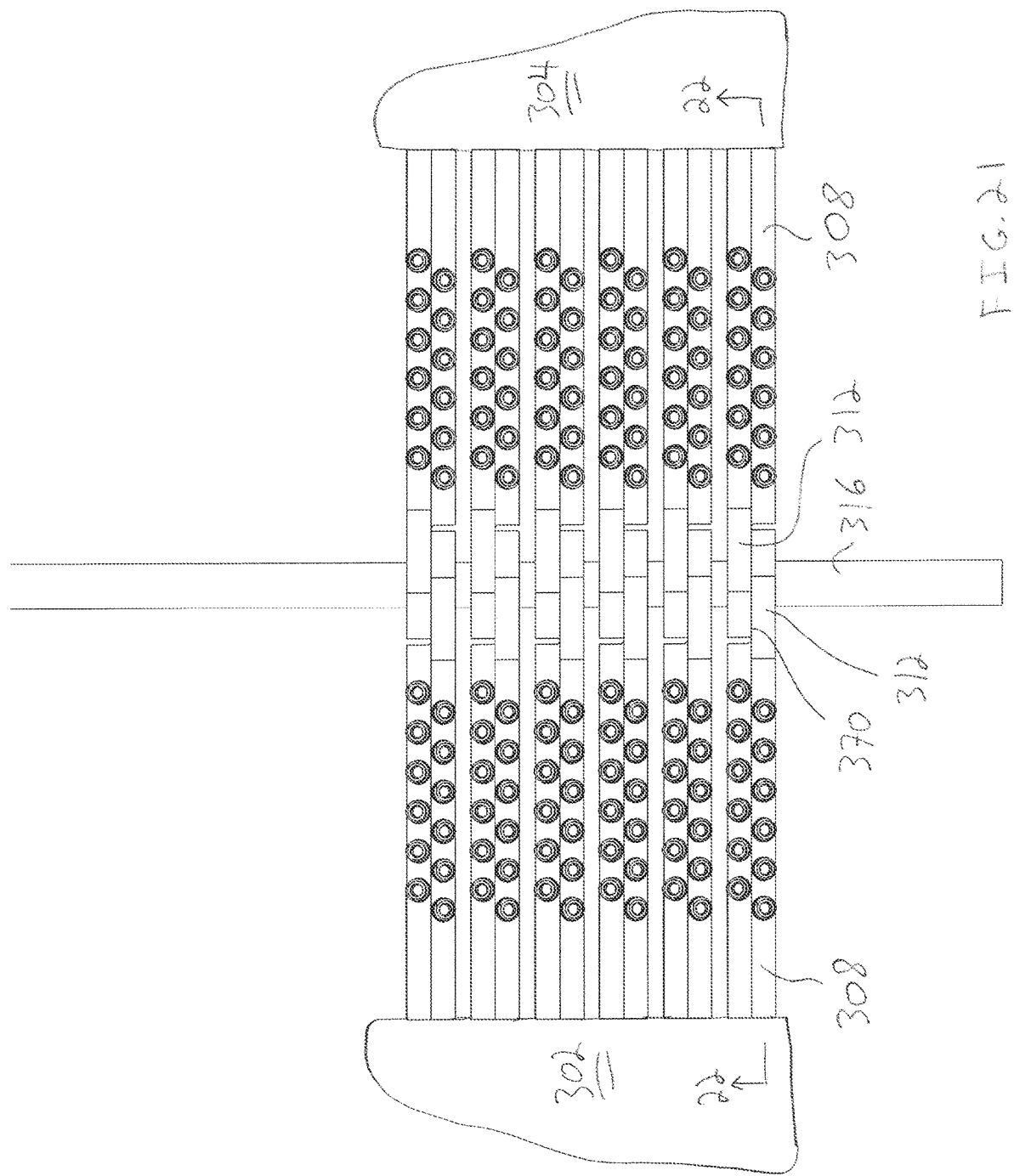
FIG. 21 is a top plan view of a portion of the splice of FIG. 14 showing loops of the fasteners laced about the hinge pin.
Figure 22:
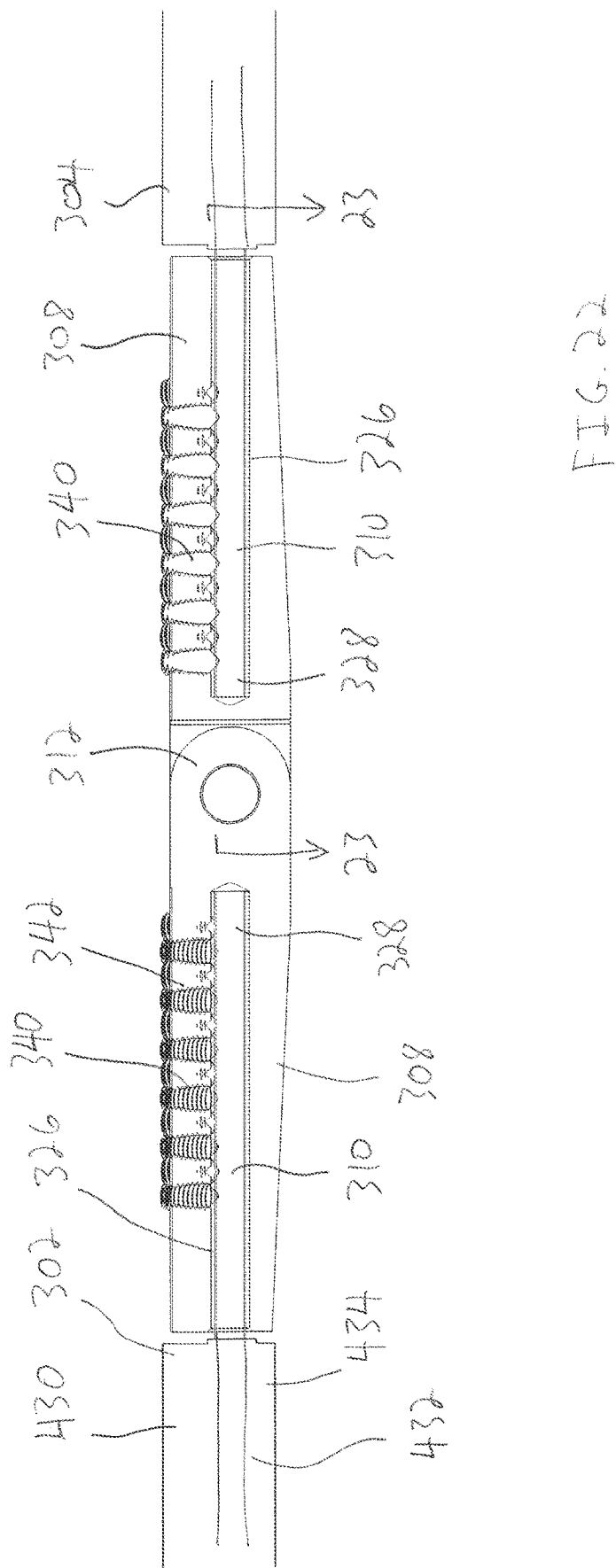
FIG. 22 is a cross-sectional view taken across line 22-22 in FIG. 21 showing set screws of the fasteners tightened into engagement with cables of the conveyor belt ends.

With reference to FIG. 21, the fasteners 308 are shown secured to the cables 310 and the loops 312 of fasteners 308 are in a laced arrangement on the hinge pin 316. With reference to FIG. 22, each cable 310 extends in the blind bore 326 of one of the fasteners 308. The conveyor belt ends 302, 304 each include an upper cover 430, an intermediate portion 432 including the cables 310 and surrounding rubber, and a lower cover 434. During installation of the fasteners 308 on the conveyor belt ends 302, 304, the material of the conveyor belt ends 302, 304 is cleaned off of the cables 310 to expose the cables 310. The fasteners 308 are slid onto the cables 310 and the set screws 340 are tightened down to secure the cables 310 in the fasteners 308.

Figure 23:
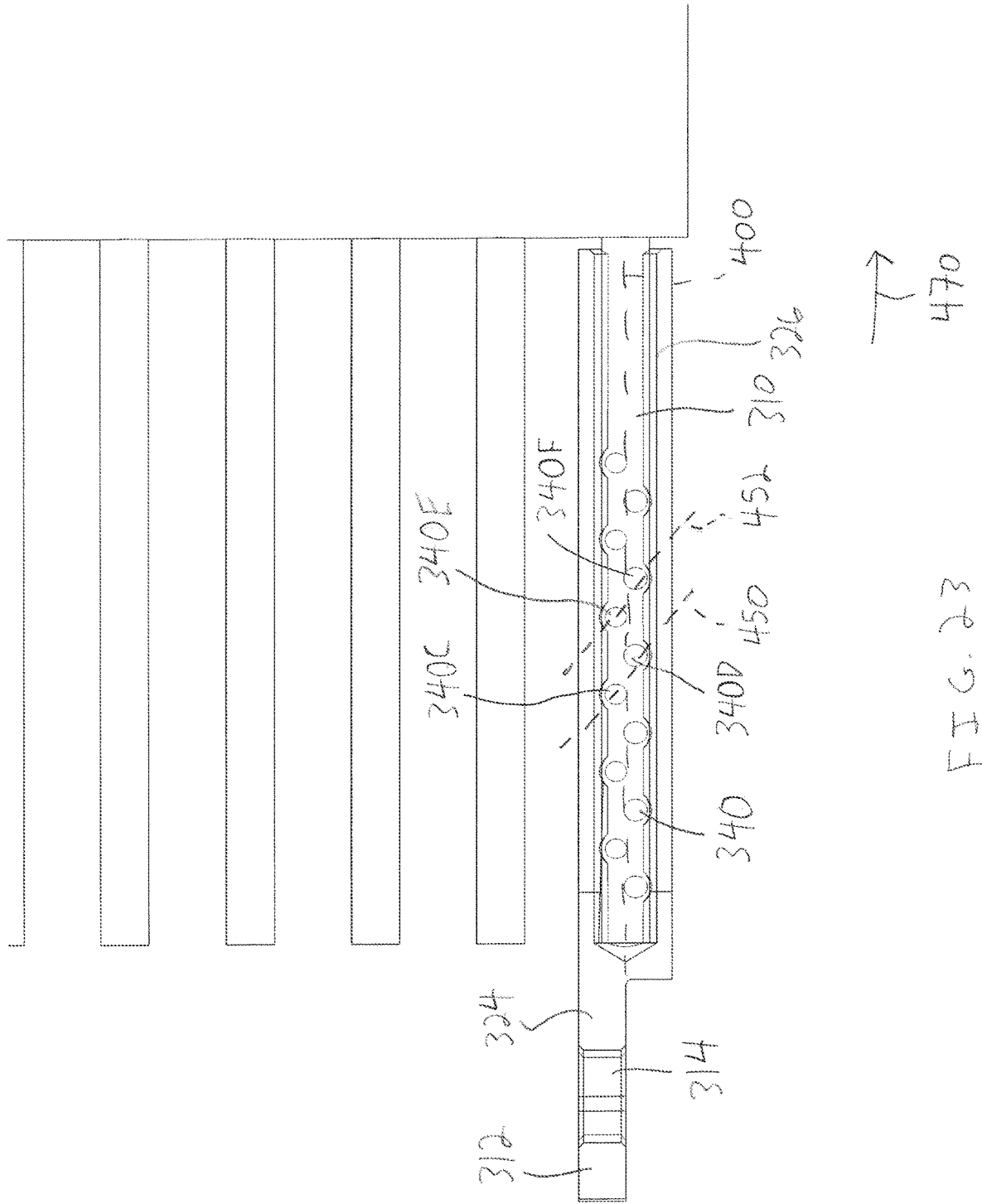
FIG. 23 is a cross-sectional view taken across line 23-23 in FIG. 22 showing the set screws of one of the fasteners contacting an outer surface of the cable received therein at laterally alternating locations such that each set screw is spaced laterally and longitudinally from adjacent set screws.

With reference to FIG. 23, the set screws 342 contact the cable 310 in a zigzag or alternating pattern with each of the set screws 342 contacting the cable 310 generally on opposite sides of the central longitudinal axis 400 of the blind bore 326 when viewed as shown in FIG. 23. Each set screw 342 is spaced both longitudinally and laterally from adjacent set screws 342 and these adjacent set screws 342 push the cable 310 down but in oblique directions generally opposite to the oblique direction of the adjacent set screws 342 relative to the vertical axis 402.

The staggered pattern of the contact of the set screws 340 against the cable 310 positions pairs of the set screws 340C, 340D, 340E, and 340F along transverse axes 450, 452. The transverse axes 450, 452 may be oblique relative to the central longitudinal axis 400. The alternating positioning of the set screws 340 permits the set screw 340 to contact different bundles of wires of the cable 310. Stated differently, as the bundles of wires of the cable 310 extend helically around the central bundle of the cable 310, the different bundles will be presented to the different set screws 340 along the length of the blind bore 326. The engagement of the set screws 340 with different bundles of wires of the cable 310 provides a mechanical lock on each bundle of wires. This provides resistance to turning of the cable 310 within the blind bore 326 in addition to the set screws 342 compressing the cable 310 against the fastener lower wall 315 and inhibiting pull-out of the cable 310 in direction 470. In one embodiment, the fastener body 324 and the set screws 340 are made of one or more metallic materials such as steel.

Figure 24:
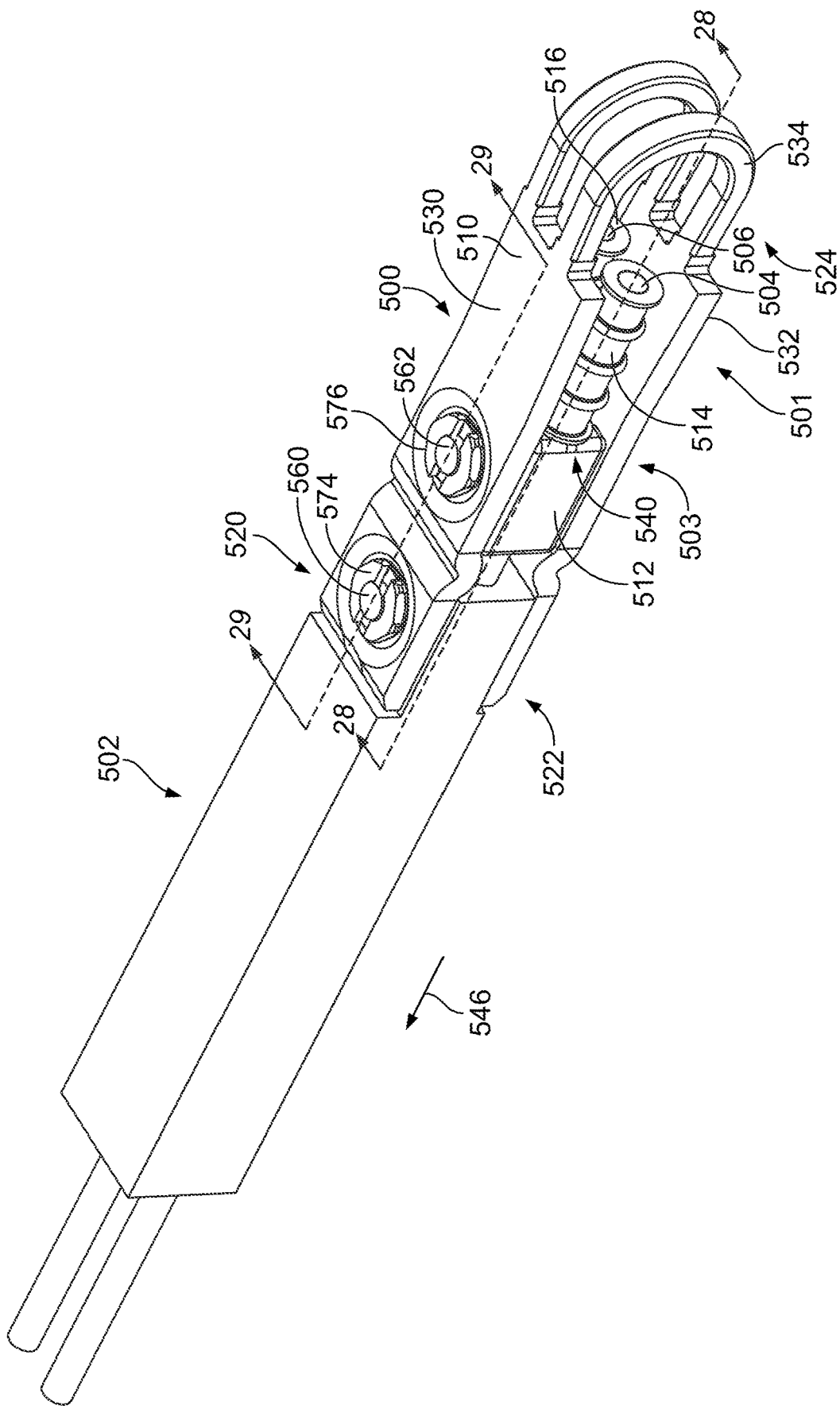
FIG. 24 is a perspective view of a fastener secured to a portion of a conveyor belt end, the fastener having ferrules crimped to cables of the conveyor belt end.

Regarding FIG. 24, a fastener 500 is provided that is similar in many respects to the fastener 20 discussed above such that differences be highlighted. The fastener 500 is shown secured to a portion of a conveyor belt end 502 having cables 504, 506 that are embedded in a belt material 508 (see FIG. 30) such as one or more layers of rubber. In FIG. 24, the fastener 500 includes a connector 501 having a fastener body 510 and a stop 503. In one embodiment, the stop 503 includes a stop body such as a ferrule support 512. The fastener 500 includes a spacer 518 (see FIG. 25) and one or more crimps such as ferrules 514, 516 secured to the cables 504, 506. The fastener body 510 includes an upper member such as an inboard upper plate 530, a lower member such as an inboard lower plate 532, and an outboard loop portion 524. The fastener body 510 extends from an upper inboard end portion 520 of the upper plate 530, through one or more loops 534 of the outboard loop portion 524, and to a lower inboard end portion 522 of the lower plate 532.

Figure 25:
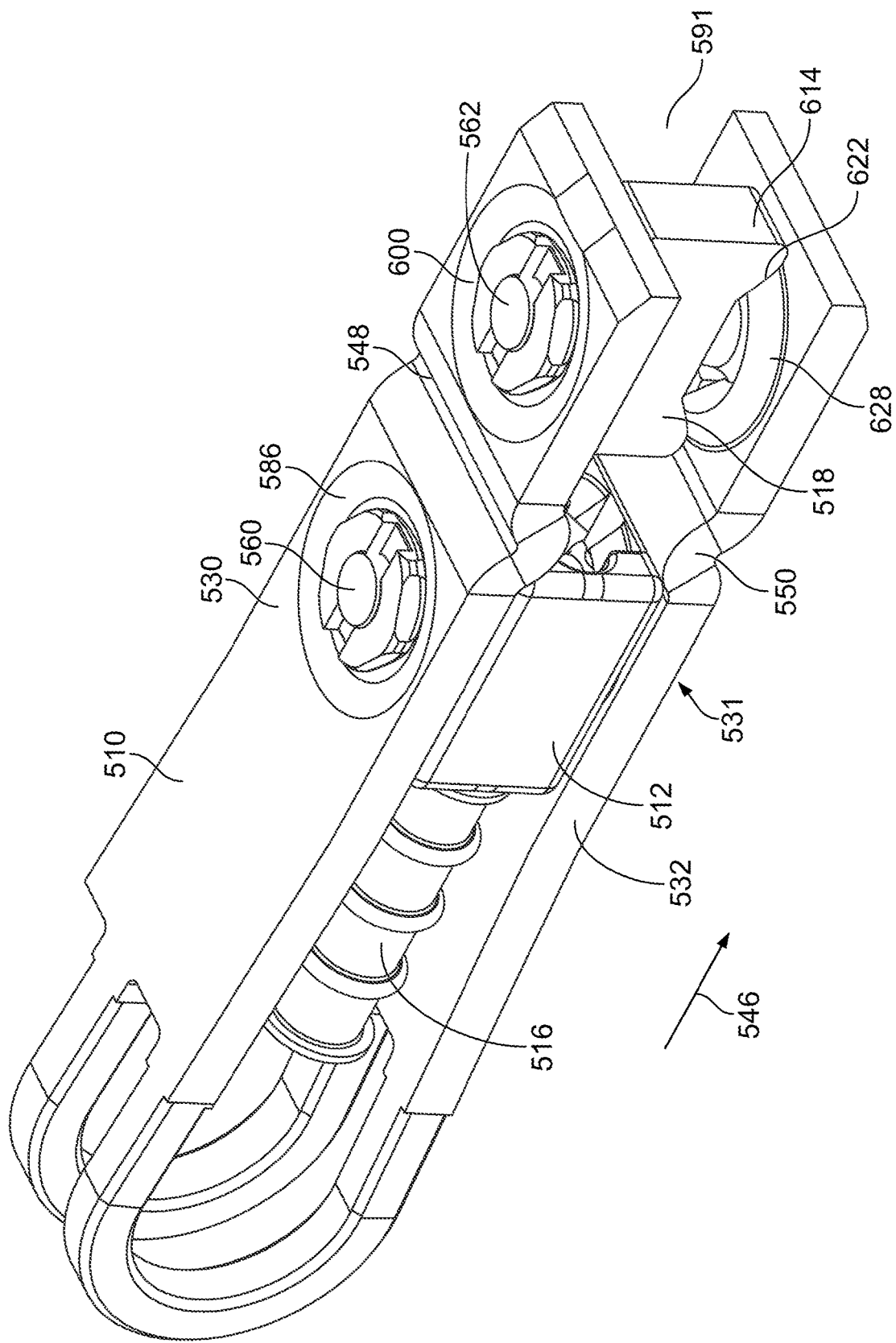
FIG. 25 is a perspective view of the fastener of FIG. 24 showing one of the ferrules, a fastener body, a ferrule support, and a spacer of the fastener.
Figure 26:
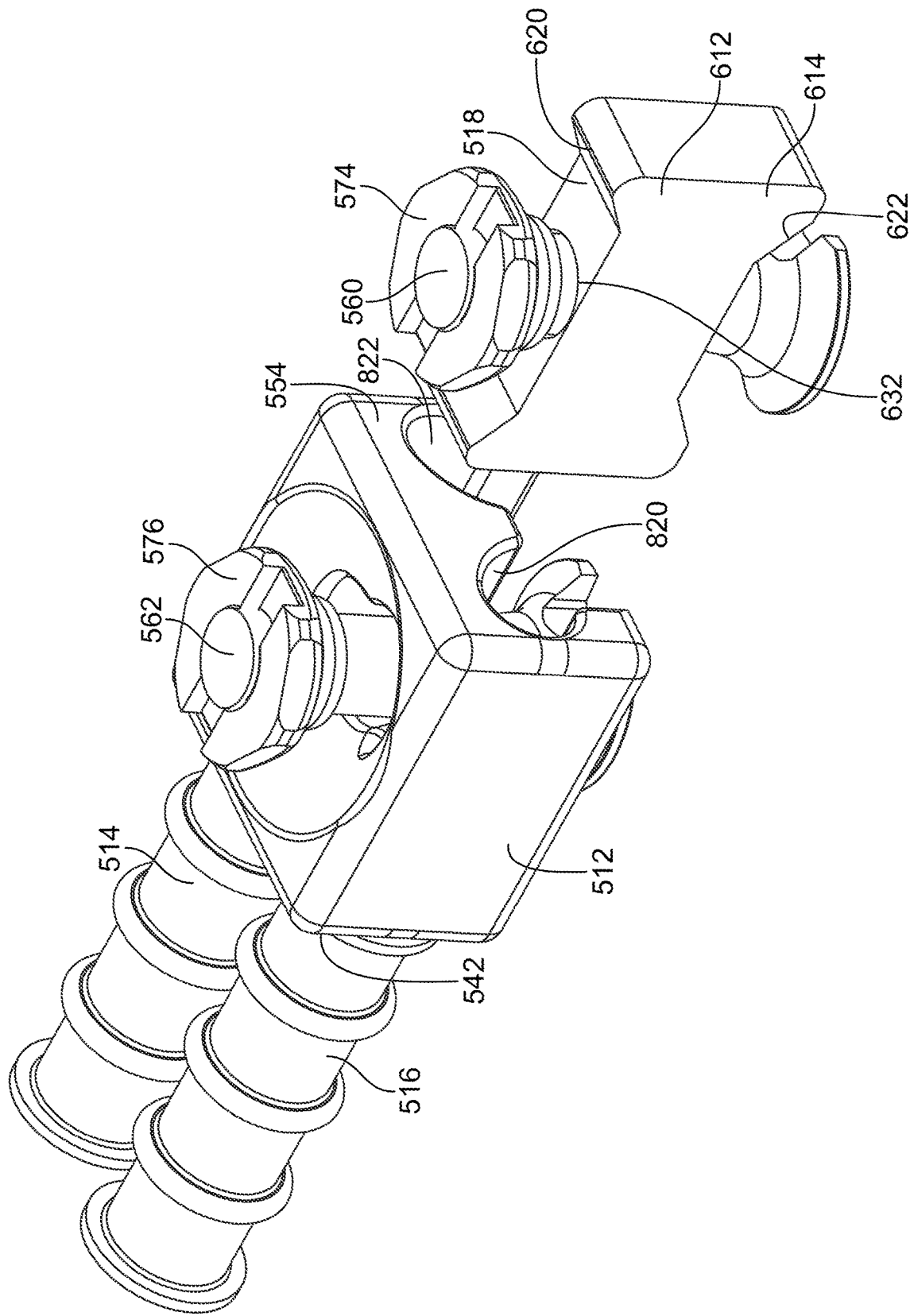
FIG. 26 is a perspective view similar to FIG. 25 with the fastener body removed to show bolts of the fastener that extend through the ferrule support and the spacer.

Regarding FIGS. 25 and 26, the ferrule support 512 has a ferrule-facing wall 542 to resist movement of the ferrules 514, 516 in pull-through direction 546. The fastener body 510 further includes a ferrule support stop 531 to limit movement of the ferrule support 512. The ferrule support stop 531 may include ridges 548, 550 of the upper and lower plates 530, 532 that locally decrease the height of a gap 591 between the upper and lower plates 530, 532 to be less than a height of the ferrule support 512. The ferrule support stop 531 may also include countersinks 586, 594 (see FIG. 27)

that engage recesses 584, 585 of the ferrule support 512. Regarding FIG. 25, when the fastener 510 is secured to the conveyor belt end 502 and linked via a hinge pin to a fastener on an opposing conveyor belt end, the tension in the cables 504, 506 urges the ferrules 514, 516 against the ferrule-facing wall 542 of the ferrule support 512. The compression of the ferrules 514, 516 against the ferrule support 512 urges an inboard-facing wall 554 of the ferrule support 512 in direction 546 against the ridges 548, 550 and tightly engages the ferrule support 512 with the countersinks 586, 594 of the fastener body 510. The assembly of the ferrules 514, 516, ferrule support 512, and fastener body 510 thereby provides a rigid construct to transfer the tension in the cables 504, 506 to the hinge pin of the splice and the associated fasteners of the opposing conveyor belt end.

Figure 27:
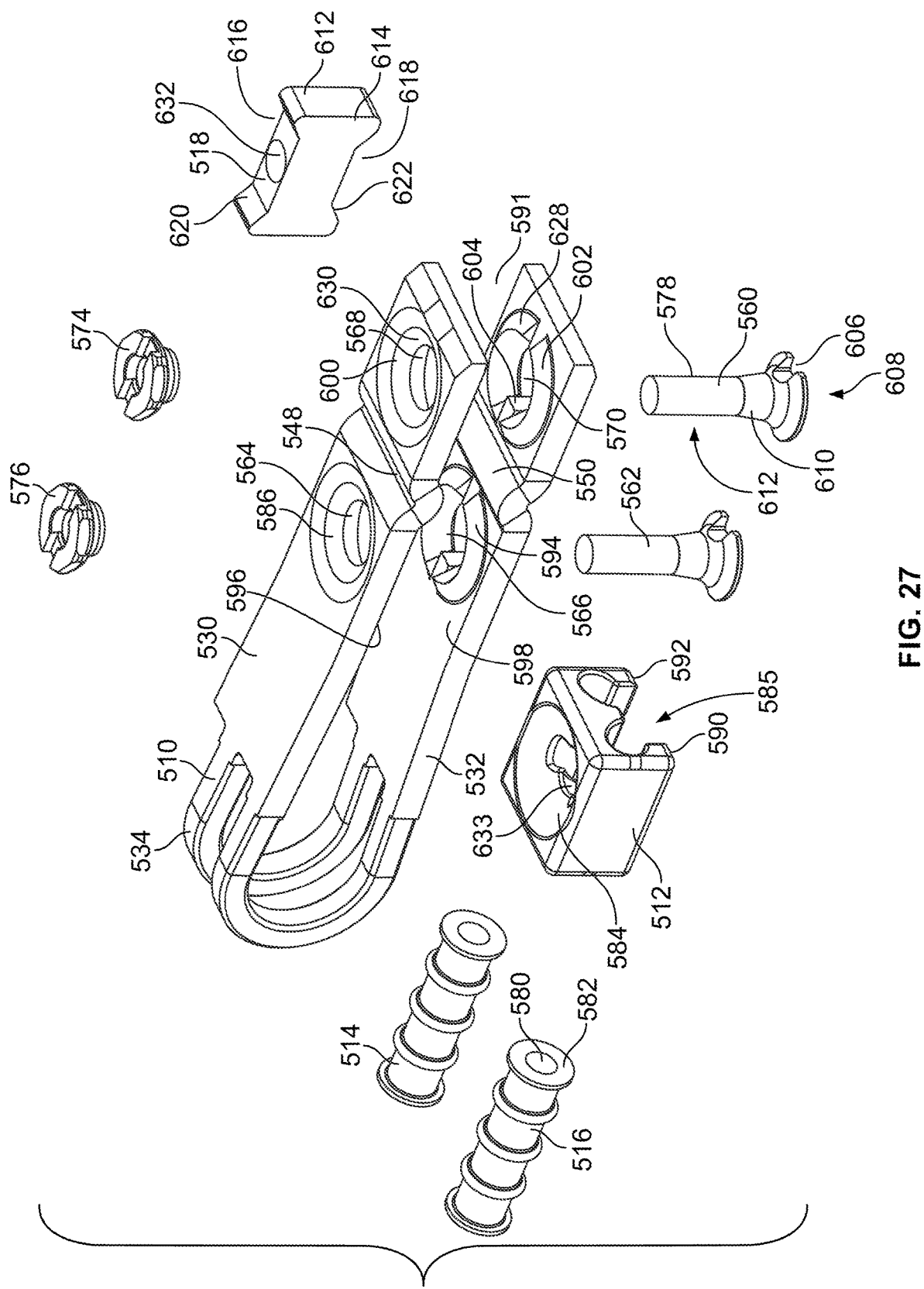
FIG. 27 is an exploded view of the fastener of FIG. 25 showing countersinks of the upper and lower plates of the fastener body.

With reference to FIG. 27, the fastener 500 includes one or more attachment members, such as bolts 560, 562, extending apertures or through openings 564, 566 and 568, 570 of the upper and lower plates 530, 532. The fastener 500 further includes nuts 574, 576 that engage threaded portions 578 of the bolts 560, 562 and keep the upper and lower plates 530, 532 into clamped engagement with the ferrule support 512 and the spacer 518. In other embodiments, one or more rivets or screws may be used instead of or in addition to the bolts 560, 562 and nuts 574, 576.

In FIG. 27, the ferrules 514, 516 are shown in a deformed configuration and have central throughbores 580 that receive the cables 504, 506 and ridges 582 that abut the ferrule-facing wall 542 of the ferrule support 512. The ferrule support 512 is similar to the ferrule support 54 discussed above and includes the upper recess 584 that mates with the countersink 586 of the upper plate 530. The ferrule support 512 has a pair of spaced apart sidewalls 590, 592 with lower beveled surfaces thereon that form the recess 585 which mates with the countersink 594 of the lower plate 532. The countersink 586 extends downward from an inner surface 596 of the upper plate 530 while the countersink 594 extends upwardly from an inner surface 598 of the lower plate 532. The upper and lower plates 530, 532 further include a countersink 600 and a countersink 602 that also extend inwardly from the inner surfaces 596, 598.

The bolts 560, 562 each include a head portion 608 that is seated in one of the countersinks 594, 602 and shank portions 612 that extend into the gap 591 between the upper and lower plates 530, 532. The head portion 608 may have a lower surface with a shape, e.g., frustoconical, that seats against an inner surface of the countersinks 594, 602. The head portion 608 likewise has a flat upper surface that is flush with or below a lower surface of the lower plate 532 (see FIG. 28) to reduce the profile of the bolts 560, 562 on the lower plate 532 and limit ingress of debris into the openings 566, 570 of the countersinks 594, 602.

The countersinks 594, 602 include anti-rotation members, such as tabs 604, that extend into recesses 606 of head portions 608 of the bolts 560, 562. The engagement between tabs 604 and recesses 606 fixes the bolts 560, 562 against rotation in the openings 566, 570. Further, the head portions 608 of the bolts 560, 562 include tapered portions 610 that taper gradually to the threaded portion 578 and increase the durability of the bolts 560, 562.

Regarding FIG. 27, the spacer 518 may be made of a rigid material, such as steel, to resist movement of the upper and lower plates 530, 532 toward one another during conveyor belt operation. By describing the spacer 518 as rigid, it is intended that the spacer 518 resists compression during operation of the conveyor belt and provides a hard stop for the upper and lower plates 530, 532. The spacer 518 resists movement of the upper and lower plates 530, 532 toward each other and the bolt 560 and nut 574 resist movement of the upper and lower plates 530, 532 away from each other. In this manner, the spacer 518, bolt 560, and nut 574 rigidly fix the upper and lower plates 530, 532 relative to one another, which maintains a more constant tension in the bolts 560, 562 and prolongs the life of the bolts 560, 562.

The spacer 518 includes an upper portion 612, a lower portion 614, and recesses 616, 618 of the upper and lower portions 612, 614. The recesses 616, 618 receive the countersinks 600, 602 of the upper and lower plates 530, 532. The spacer 518 further includes mating portions, such as upper contact surfaces 620 and lower contact surfaces 622, that are tapered to engage wall portions 628, 630 of the countersinks 600, 602. The spacer 518 includes a throughbore 632 that receives the shank portion 612 of the bolt 560. The spacer 518 is dogbone-shaped and the recesses 616, 618 permit the fastener body 510 and countersinks 600, 602 thereof to be slid laterally onto the spacer 518 as discussed below with reference to FIGS. 30-32.

Figure 28:
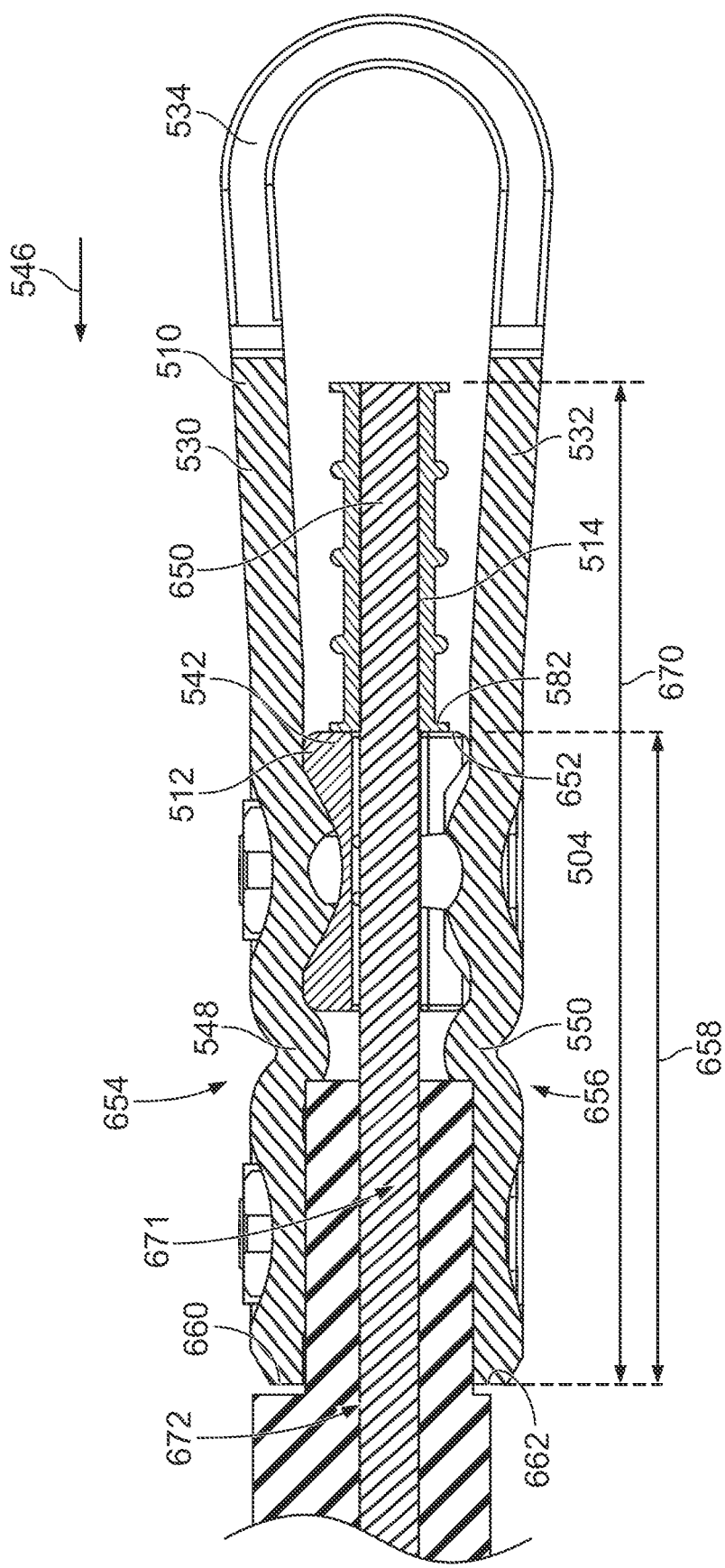
FIG. 28 is a cross-sectional view taken across line 28-28 in FIG. 24 showing a cable of the conveyor belt end extending between the upper and lower plates of the fastener body, through the ferrule support, and into one of the ferrules.

Regarding FIG. 28, the fastener 500 is secured to the conveyor belt end 502. The cable 504 is shown extending between the upper and lower plates 530, 532 with a cable end portion 650 of the cable 504 received in the ferrule 514. The rib 582 of the ferrule 514 contacts a stop surface 652 of the ferrule-facing wall 542 of the ferrule support 512. The cable 504 includes a plurality of wires and the cable end portion 650 includes end sections of the wires of the cable 504. Due to the compression of the ferrule 514, the end sections of the wires of cable end portion 650 are effectively fixed relative to one another and may not shift about and along each other to facilitate bending of the cable 504.

The upper and lower plates 530, 532 include longitudinal spacer portions 654, 656 that separate the ferrules 514 and cable end portions 650 therein a distance 658 from ends 660, 662 of the upper and lower plates 530, 532. Regarding cable 504, the distance 658 provides a predetermined length 670 of the cable 504 within the fastener 500. Further, the distance 658 provides a strain relief length 671 of the cable 504 extending longitudinally between the ends 660, 662 of the upper and lower plates 530, 532 of the fastener body 510 to the ferrule 514. The sections of the wires of the cable 504 along the strain relief length 671 may shift about and along each other with bending of the cable 504 to relieve stress, which increases the durability of the connection between the fastener 500 and the cable 504. In some embodiments, a portion of the strain relief length 671 of each cable 504, 506 within the fastener 500 is embedded with belt material 508.

Figure 29:
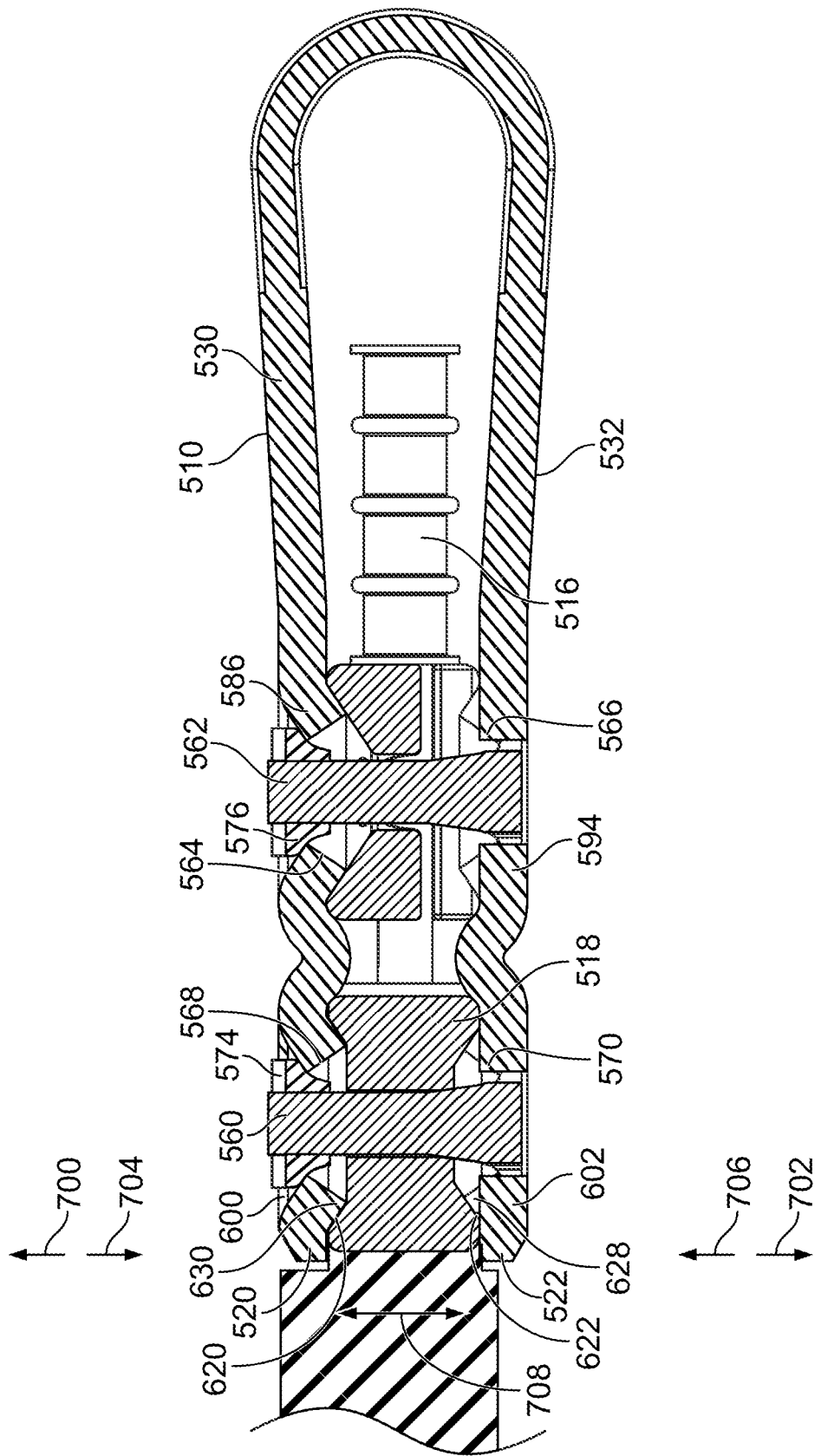
FIG. 29 is a cross-sectional view taken across line 29-29 in FIG. 24 showing the bolts extending through openings of the upper and lower plates of the fastener body and through openings of the spacer and ferrule support.

Regarding FIG. 29, the upper and lower plates 530, 532 are shown clamped onto the spacer 518 by the bolts 560, 562 and nuts 574, 576. The countersinks 600, 602 are engaged with the upper portion 612 and lower portion 614 of the spacer 518. Specifically, the wall portions 628, 630 abut the upper and lower contact surfaces 620, 622 of the spacer 518. The assembly of the nut 574 and the bolt 560 resists separation of the upper and lower plate portions 530, 532 in directions 700, 702 while the presence of the spacer 518 resists movement of the upper and lower plate portions 530, 532 toward one another in directions 704, 706. In this manner, the upper and lower plate portions 530, 532 have a fixed distance 708 between the inner surfaces 596, 598 (see FIG. 27) at the upper and lower inboard end portions 520, 522. The presence of the spacer 518 provides a rigid stop for the upper and lower plate portions 530, 532 that limits movement of the plate portions 530, 532 toward each other, followed by rebounding apart, which may create spikes in the tension of the bolts 560, 562. The spacer 518 maintains the distance between the upper and lower plate portions 530, 532 to provide a more constant tensile load on the bolts 560, 562, which may improve the lifespan of the bolts 560, 562.

Figure 30:
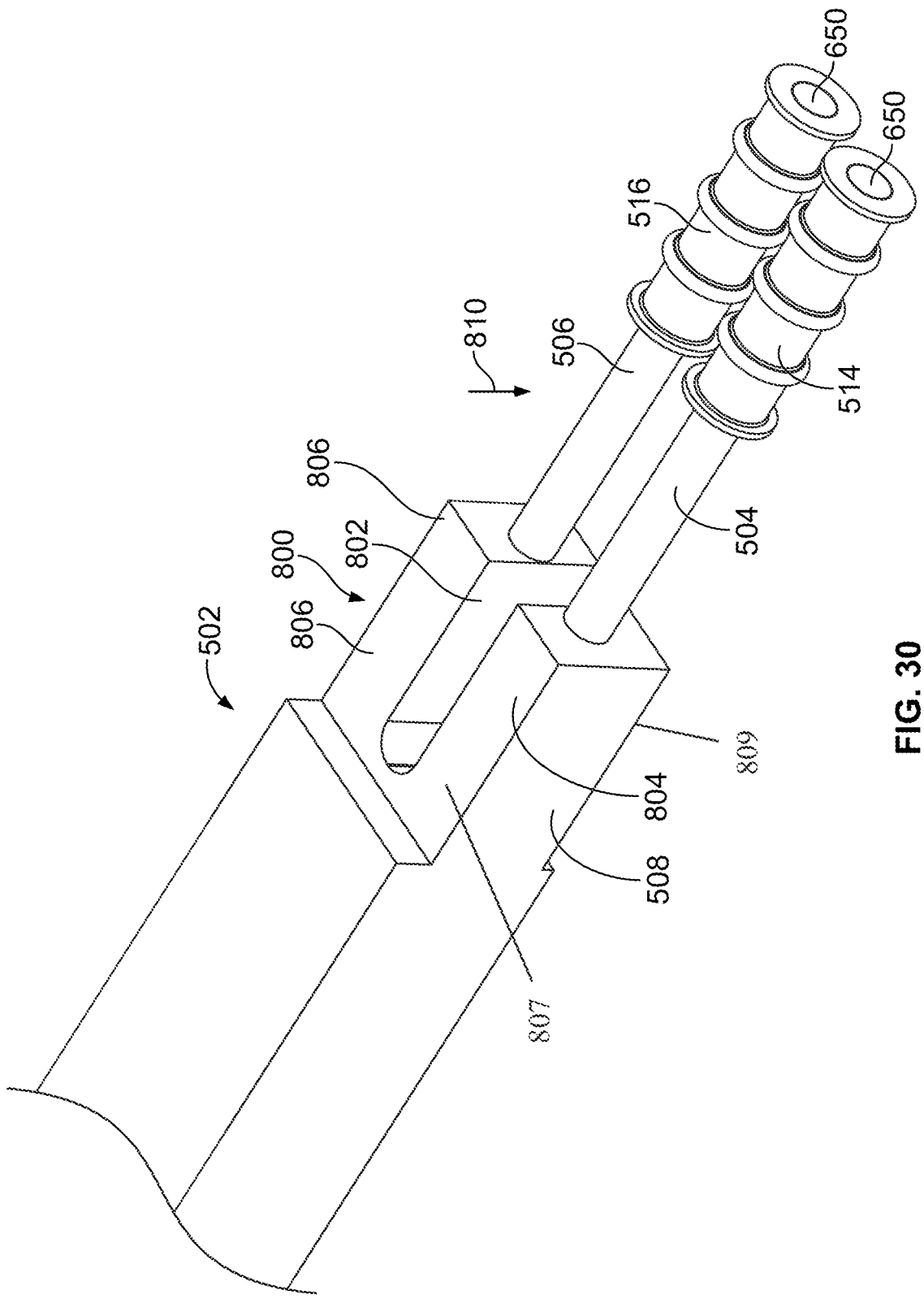
FIGS. 30, 31, and 32 show a process of connecting the ferrule support, spacer, and fastener body to the cables of the conveyor belt end of FIG. 24.
Figure 31:
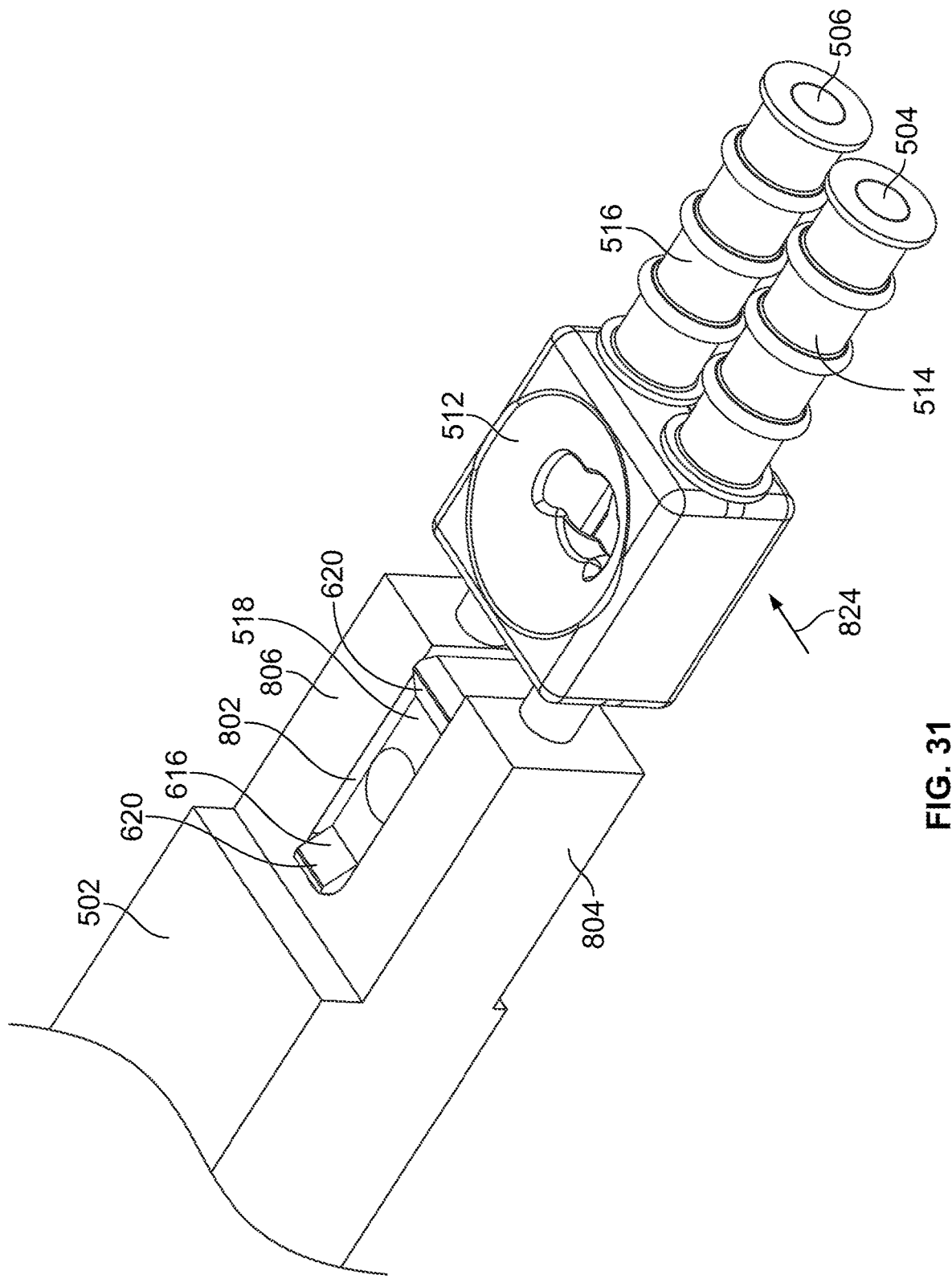
Figure 32:
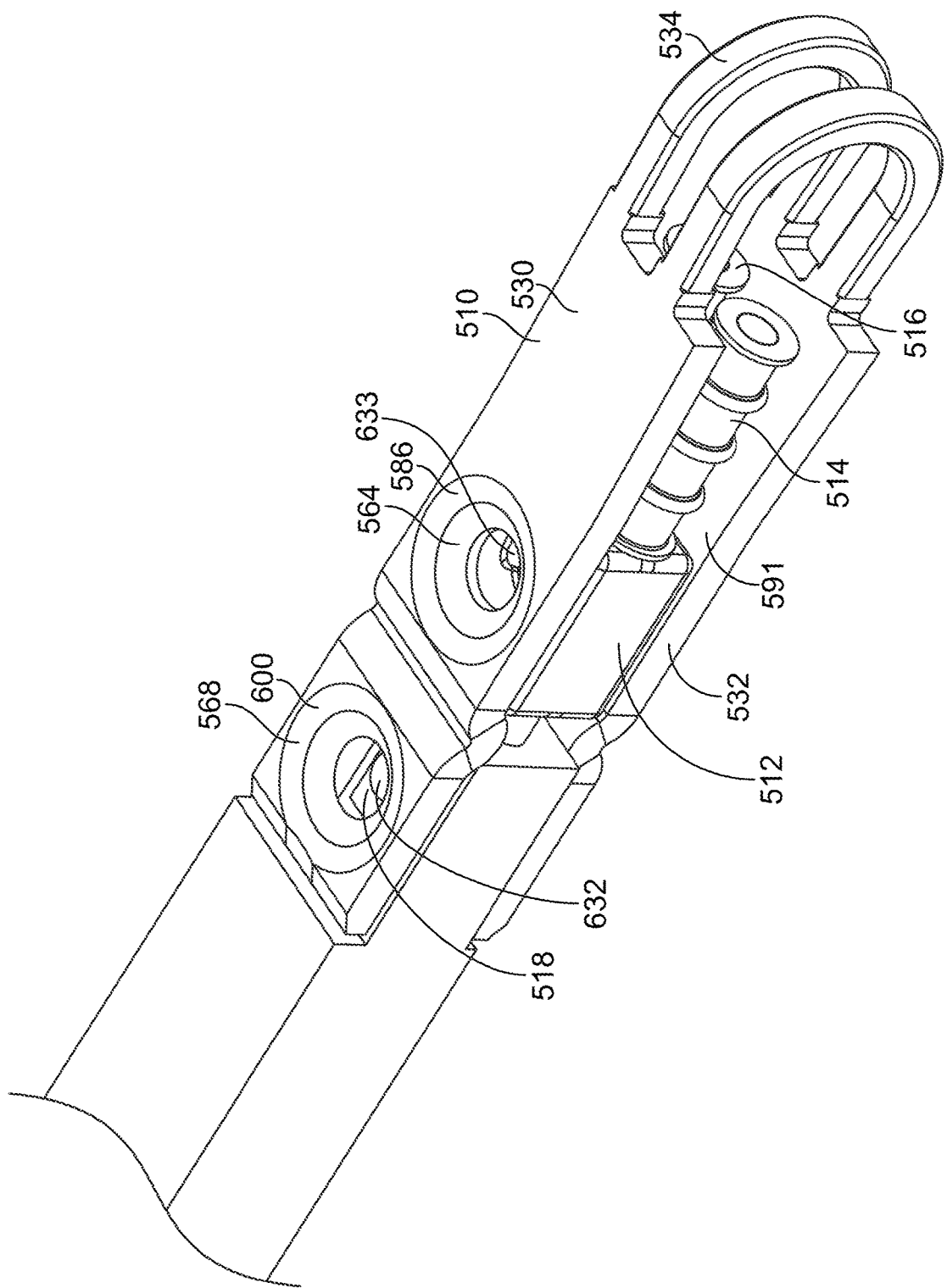

Regarding FIGS. 30-32, a method of connecting portions of the fastener 500 to the conveyor belt end 502 is disclosed. The method includes preparing the conveyor belt end 502 to have a tongue or skived portion 800 and trimming the belt material 508 to expose the cables 504, 506. The skived portion 800 includes upper and lower surfaces 807, 809 of the conveyor belt end 502. The trimming also includes forming a gap 802 in the belt material 508 that separates portions 804, 806 of the belt material 508. The ferrules 514, 516 are applied to the end portions 650 of the cables 504, 506 as discussed above. The ferrule support 512 is advanced downwardly in direction 810 onto the cables 506 and the spacer 518 is fit in direction 810 into the gap 802. In FIG. 31, the spacer 518 is held between the portions 804, 806 of the conveyor belt material 508 embedding the cables 504, 506. In another embodiment, the belt material 508 may be completely removed on each side of the spacer 518.

Regarding FIGS. 26 and 31, the cables 504, 506 extend along opposite sides of the spacer 518, through the through openings 820, 822 of the ferrule support 512, and into the throughbores 580 of the ferrules 514, 516. With the spacer 518, ferrule support 512, and ferrules 514, 516 positioned on the cables 504, 506, the fastener body 510 may then be advanced laterally in direction 824 so that the upper and lower plates 530, 532 sandwich the spacer 518 and ferrule support 512 therebetween.

Regarding FIGS. 27 and 32, the countersinks 586, 594 of the fastener body 510 mate with the corresponding recesses 584, 585 of the ferrule support 512 and the countersinks 600, 602 mate with the recesses 616, 618 of the spacer 518. In this configuration, the openings 568, 570 are aligned with the throughbore 632 of the spacer 518 and the openings 564, 566 are aligned with the through opening 633 of the ferrule support 512. The bolts 560, 562 may be advanced through the aligned openings of the fastener body 510, spacer 518, and ferrule support 512 and the nuts 574, 576 tightened onto the threaded shank portions 612 of the bolts 560, 562. The fastener 500 is thereby secured to the conveyor belt end 502. In one embodiment, the bolts 560, 562 have a length larger than the height of the fastener body 510. Once the nuts 574, 576 have been tightened down onto bolts 560, 562, the excess lengths of the bolts 560, 562 projecting beyond the upper plate 530 are removed using a bolt breaker. This positions the ends of the bolt shank portions 578 flush with or below an upper surface of the upper plate 530.

Figure 33:
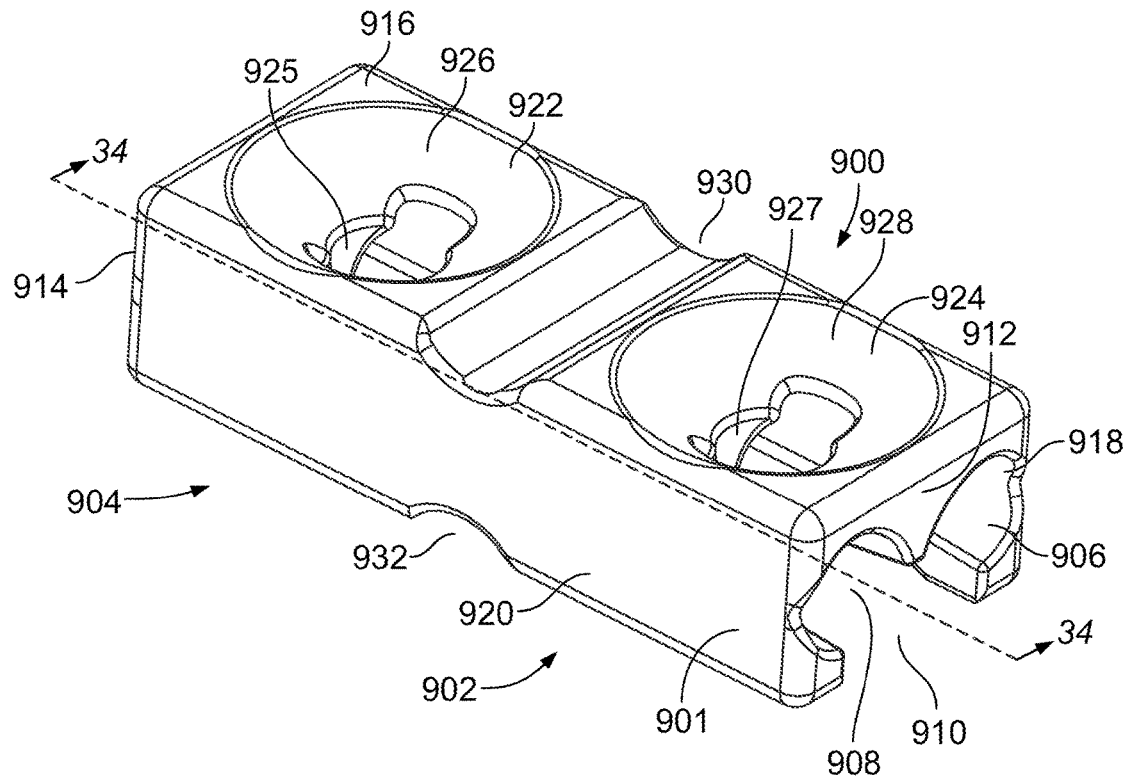
FIG. 33 is a perspective view of a support having a spacer portion and ferrule support portion that may be utilized with the fastener body of FIG. 24.
Figure 34:
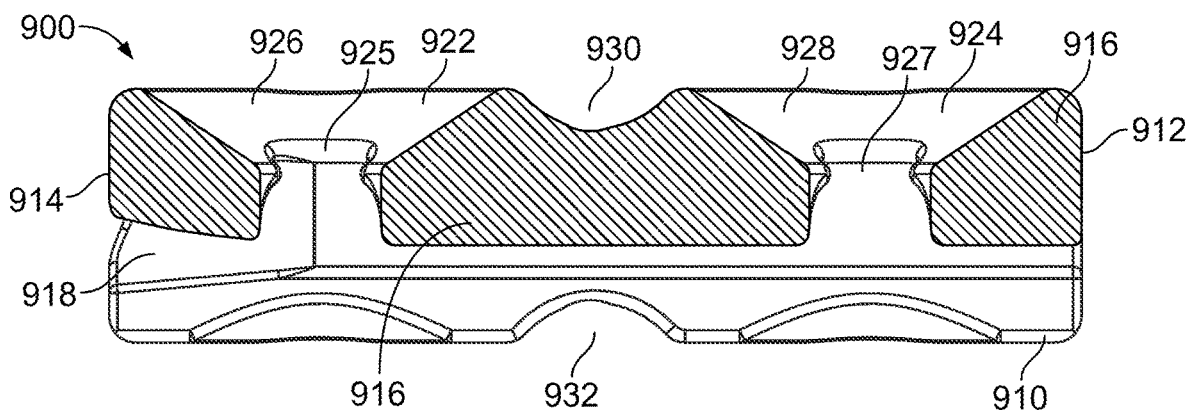
FIG. 34 is a cross-sectional view taken across line 34-34 in FIG. 33 showing recesses of an upper wall of the support that are configured to mate with countersinks projecting downwardly from an upper plate of the fastener body.

Regarding FIG. 33, a support 900 is provided that includes a body 901 having a ferrule support portion 902 and a spacer portion 904. The body 901 has a unitary, one-piece construction and may be made of a metallic material, such as steel. The ferrule support portion 902 and spacer portion 904 provide similar operability as the ferrule support 512 and the spacer 518 discussed above such that the support 900 may be utilized in the fastener 500 in place of the ferrule support 512 and spacer 518. Because the support 900 has a one-piece construction, the support 900 may readily positioned on and supported by the cables 504, 506 even if the belt material 508 has been trimmed so that there are no belt material portions 804, 806 on the cables 504, 506.

The support 900 includes through openings 906, 908 for receiving the cables 504, 506 and a lower opening 910 that permits the support 900 to be advanced downwardly onto the cables 504, 506. The support 900 includes a ferrule-facing wall 912 against which the ferrules 514, 516 may abut and an outboard facing wall 914. The support 900 includes an upper wall 916 and depending side walls 918, 920. The upper wall 916 includes upper recesses 922, 924 for receiving, respectively, countersinks 586, 600 of the upper plate 530 of the fastener body 510. The side walls 918, 920 includes lower beveled surfaces 954, 956 (see FIG. 36) configured to form mating engagements with the outer surfaces of the countersinks 598, 602. The upper wall 916 also includes through openings 925, 927 that permit the bolts 560, 562 to extend therethrough and connect the upper and lower plates 530, 532 of the fastener body 510. To fix the support 900 within the fastener body 510, the support 900 includes grooves 930, 932 that mate with the ridges 548, 550 of the upper and lower plates 530, 532.

Figure 35:
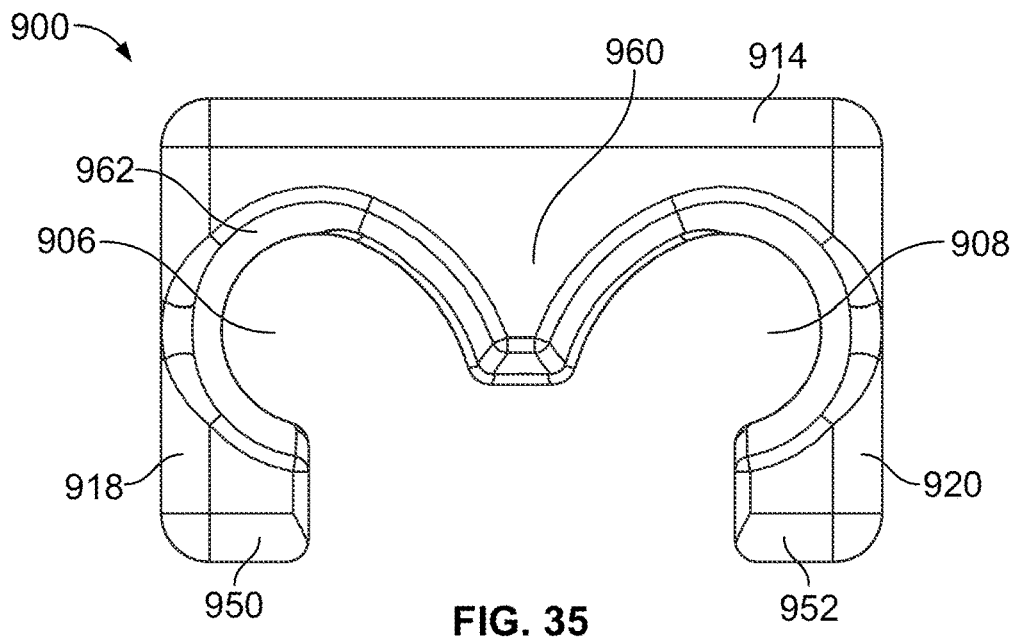
FIG. 35 is an end elevational view of the support of FIG. 33 showing enlarged portions of through openings of the support at an inboard facing wall of the support.
Figure 36:
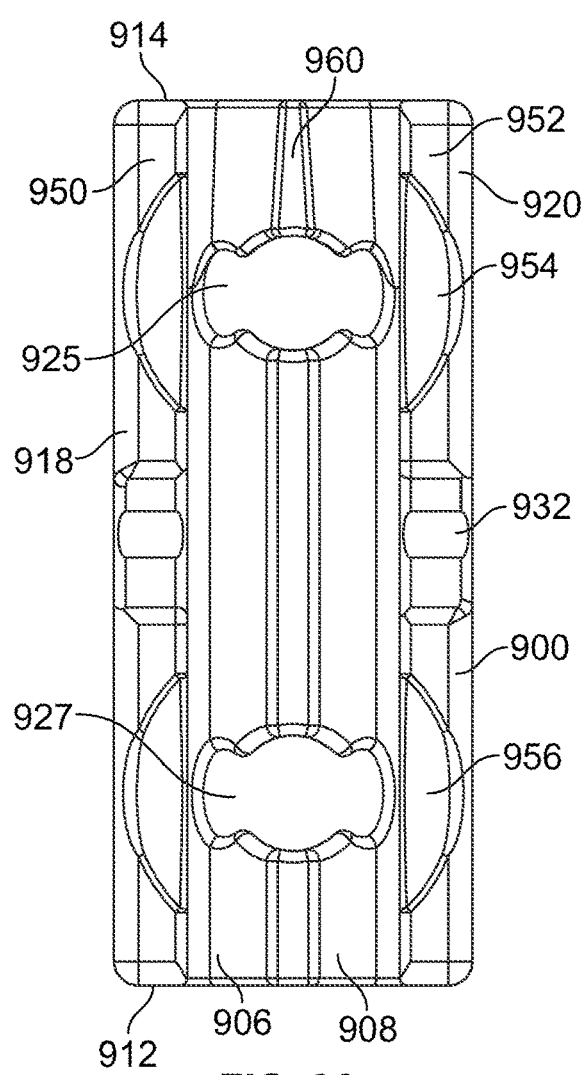
FIG. 36 is a bottom plan view of the support of FIG. 33 showing sidewalls of the support having lower beveled surfaces for mating with countersinks projecting upwardly from a lower plate of the fastener body.

Regarding FIGS. 35 and 36, the side walls 918, 920 include ledge portions 950, 952 having the beveled surfaces 954, 956 thereon. The support 900 includes a saddle portion 960 that extends between the cables received in the through openings 906, 908. The saddle portion 960 and side walls 918, 920 cooperate to form a loose slip fit between the support 900 and the cables 504, 506 during installation of the fastener 500 on the cables 504, 506. Once the fastener 500 has been secured to the cables 504, 506, the saddle portion 960 and side walls 918, 920 are configured to be spaced from the cables 504, 506. To provide clearance for the cables 504, 506 and accommodate bending of the cables, the support 900 includes flared surfaces 962 extending about the through openings 906, 908 near the outboard facing wall 914. The flared surfaces 962 provide clearance for the cables 504, 506 to limit contact between the cables 504, 506 and the support 900 near the outboard facing surface 914. Regarding FIG. 36, the saddle portion 960 may also narrow as the saddle portion 960 nears the outboard facing wall 914. The narrowing of the saddle portion 960 provides further clearance for movement of the cables 504, 506.

Figure 37:
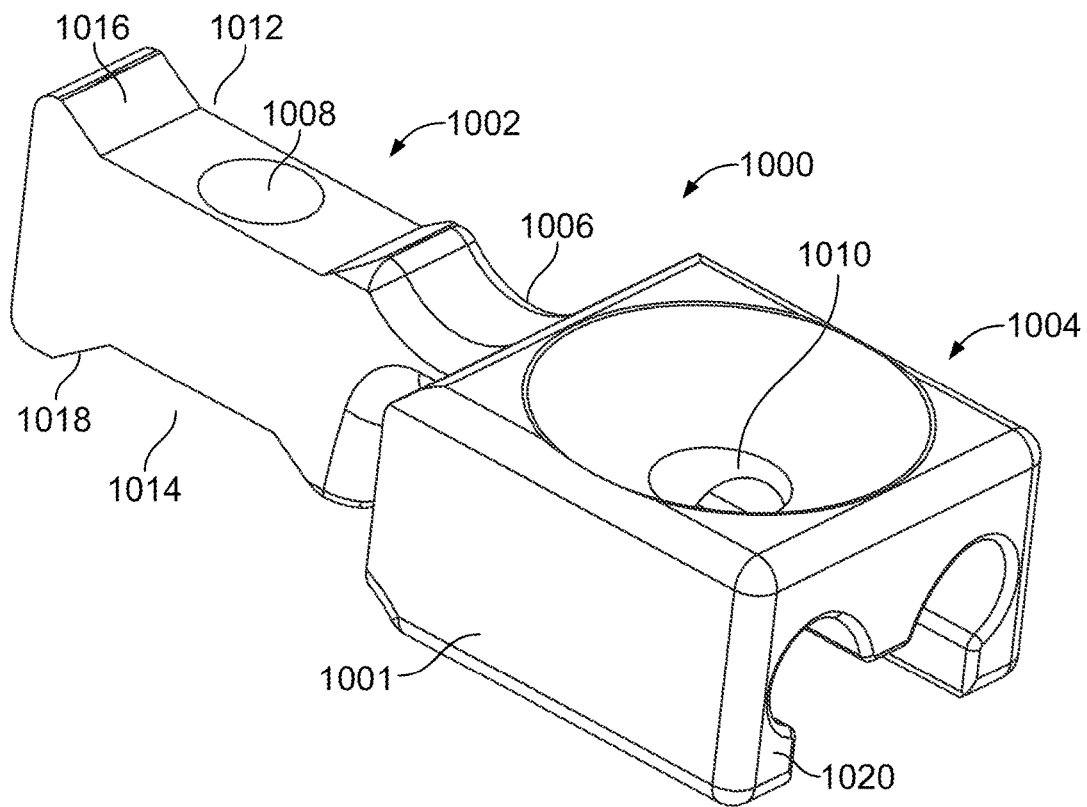
FIG. 37 is a perspective view of another support having a spacer portion and a ferrule support portion.

With reference to FIG. 37, a support 1000 is provided that includes a body 1001 having a spacer portion 1002 and a ferrule support portion 1004. The body 1001 has a unitary, one-piece construction and may be made of a metallic material, such as steel. The spacer portion 1002 operates similarly to the spacer 518 discussed above and the ferrule support portion 1004 operates similarly to the ferrule support 512 discussed above. The support 1000 has a connecting portion 1006 joining the spacer portion 1002 and the ferrule support portion 1004. The spacer portion 1002 includes a throughbore 1008 for receiving the bolt 560 and the ferrule support portion 1004 includes a through opening 1010 to receive the bolt 562.

Figure 38:
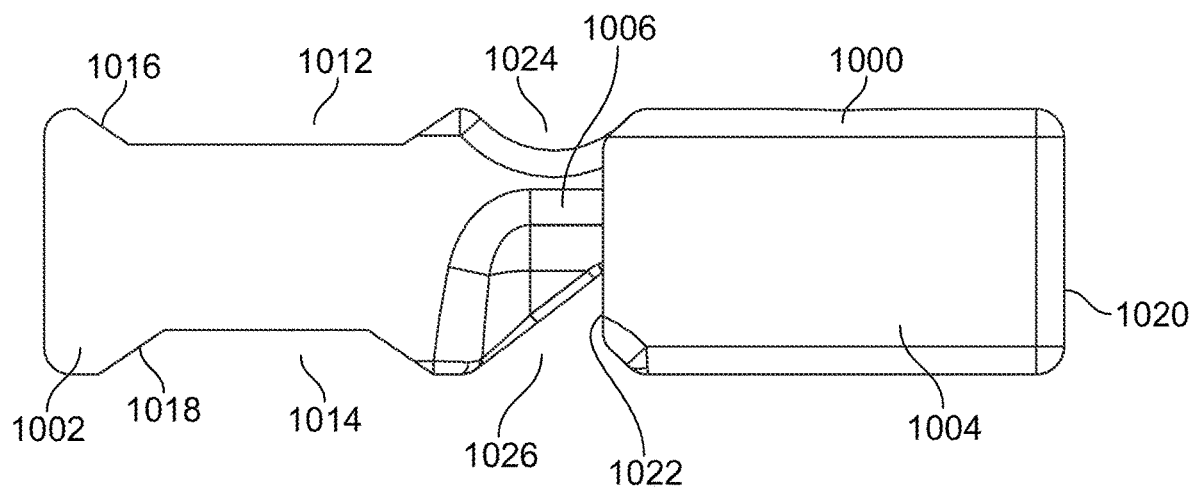
FIG. 38 is a side elevational view of the support of FIG. 37 showing a narrow connecting portion joining the spacer portion and the ferrule support portion.

Regarding FIG. 38, the spacer portion 1002 includes recesses 1012, 1014 that receive the countersinks 600, 602 and contact surfaces 1016, 1018 that engage the countersinks 600, 602 and provide a rigid stop for the upper and lower plates 530, 532. At the other end of the support 1000, the ferrule support portion 1004 includes a ferrule-facing wall 1020 for abutting the ferrules 514, 516 and an inboard facing wall 1022 for contacting the ridges 548, 550 of the upper and lower plates 530, 532. In one embodiment, the connecting portion 1006 includes a recess 1024 that receives the ridge 548 and a recess 1026 that receives the ridge 550.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, the materials and the sizes of the components of the fasteners 20, 308 may be selected to handle specific belt tension requirements. It is intended that the phrase "at least one of"

as used herein be interpreted in the disjunctive sense. For example, the phrase "at least one of A and B" is intended to encompass only A, only B, or both A and B.

What is claimed is:

1. A fastener for securing to an end of a conveyor belt, the fastener comprising:
a tubular member to be secured to a first cable of the conveyor belt end;
a fastener body of a first material, the fastener body having an upper portion, a lower portion, and a loop portion connecting the upper and lower portions so that the upper and lower portions have a gap therebetween;
a stop body of a second material different than the first material, the stop body sized to fit in the gap between the upper and lower portions of the fastener body; and
the stop body configured to block movement of the tubular member away from the loop portion of the fastener body.

2. The fastener of claim 1 wherein the stop body includes a through opening to permit the cable to extend through the stop body and a stop surface portion extending about the through opening to engage the tubular member and block movement of the tubular member away from the loop portion of the fastener body.

3. The fastener of claim 1 wherein the upper portion and the lower portion of the fastener body each include a plurality of protrusions extending into the gap to resist movement of the stop body away from the loop portion.

4. The fastener of claim 3 wherein the protrusions include an upper ridge and an upper countersink of the upper portion and a lower ridge and a lower countersink of the lower portion.

5. The fastener of claim 1 wherein the upper and lower portions of the fastener body are configured to permit the cable to extend longitudinally between and spaced from the upper and lower portions; and
wherein the upper and lower portions include upper and lower lateral ridges extending into the gap to resist movement of the stop body away from the loop portion.

6. The fastener of claim 1 wherein the upper and lower portions of the fastener body include upper and lower apertures, the fastener further comprising:
an attachment member configured to extend through the upper and lower apertures of the upper and lower portions of the fastener body.

7. The fastener of claim 6 wherein the stop body has an aperture configured to be aligned with the upper and lower apertures of the upper and lower portions of the fastener body with the stop body in the gap between the upper and lower portions; and
wherein the attachment member is configured to extend through the upper and lower apertures of the fastener body and the aperture of the stop body.

8. The fastener of claim 1 wherein the upper and lower portions include upper and lower inboard end portions of the fastener body to be positioned adjacent upper and lower surfaces of the conveyor belt; and
wherein the stop body includes a spacer portion at the upper and lower inboard end portions of the fastener body with the stop body received in the gap, the spacer portion inhibiting the upper and lower inboard end portions of the fastener body from moving toward one another during operation of the conveyor belt.

9. The fastener of claim 1 further comprising another tubular member to be secured to another cable of the conveyor belt end; and
wherein the stop body is configured to block movement of the tubular members away from the loop portion.

10. The fastener of claim 9 wherein the stop body has at least one through opening sized to permit the cables to extend through the stop body; and
at least one stop surface portion of the stop body extending about the at least one through opening to engage the tubular members and inhibit movement of the tubular members away from the loop portion.

11. The fastener of claim 9 further comprising an attachment member;
wherein the upper and lower portions of the fastener body include upper and lower apertures and the stop body includes an intermediate aperture; and
wherein the upper, lower, and intermediate apertures are configured to receive the attachment member therein with the attachment member extending between the cables.

12. The fastener of claim 1 wherein the tubular member is of a third material softer than the first material of the fastener body and the second material of the stop body.

13. The fastener of claim 1 wherein the upper and lower portions of the fastener body include upper and lower plate portions of the fastener body.

14. The fastener of claim 1 wherein the loop portion comprises a pair of loop portions.

15. A method of securing a fastener to an end of a conveyor belt, the method comprising:
applying a first tubular member to a first cable of the conveyor belt end;
positioning a stop body on the first cable adjacent the first tubular member;
fitting the first tubular member and stop body between upper and lower portions of a fastener body, the fastener body having a loop portion connecting the upper and lower portions; and
securing the fastener body to the stop body.

16. The method of claim 15 wherein positioning the stop body on the first cable includes positioning the stop body on the first cable so that a portion of the first cable extends in a through opening of the stop body.

17. The method of claim 15 further comprising:
applying a second tubular member to a second cable of the conveyor belt end; and
positioning the stop body on the second cable adjacent the second tubular member.

18. The method of claim 17 wherein positioning the stop body on the first cable includes positioning the stop body so that the first cable extends in at least one through opening of the stop body; and
wherein positioning the stop body on the second cable includes positioning the stop body on the second cable so that the second cable extends in the at least one through opening of the stop body.

19. The method of claim 18 wherein securing the fastener body to the stop body includes:
advancing a leading portion of an attachment member through an opening of the lower portion of the fastener body, between the first and second cables, and through an opening of the upper portion of the fastener body.

20. The method of claim 15 wherein securing the fastener body to the stop body includes advancing an attachment member through an opening in the lower portion of the fastener body, through an opening in the stop body, and through an opening in the upper portion of the fastener body.

21. The method of claim 15 wherein fitting the first tubular member and stop body between the upper and lower portions of the fastener body includes positioning the stop body adjacent stop surfaces of the upper and lower portions.

22. The method of claim 15 wherein applying the first tubular member to the first cable includes crimping the first tubular member onto the first cable.

23. The method of claim 15 wherein fitting the first tubular member and stop body between the upper and lower portions of the fastener body includes fitting the first tubular member between the upper and lower portions of the fastener body after the stop body has been positioned on the first cable.

24. The method of claim 15 further comprising:
applying a second tubular member to a second cable of a second end of the conveyor belt;
positioning a second stop body on the second cable adjacent the second tubular member;
fitting the second tubular member and second stop body between upper and lower portions of a second fastener body, the second fastener body having a loop portion connecting the upper and lower portions;
securing the second fastener body to the second stop body;
positioning the loop portions of the fastener body and the second fastener body adjacent one another; and
advancing a hinge pin into an opening defined at least in part by the adjacent loop portions of the fastener body and the second fastener body to form a hinge connection between the conveyor belt ends.

* * * * *